United States Patent
Berlin et al.

(10) Patent No.: US 10,014,944 B2
(45) Date of Patent: Jul. 3, 2018

(54) REMOTE ANTENNA CLUSTERS AND RELATED SYSTEMS, COMPONENTS, AND METHODS SUPPORTING DIGITAL DATA SIGNAL PROPAGATION BETWEEN REMOTE ANTENNA UNITS

(71) Applicant: Corning Optical Communications LLC, Hickory, NC (US)

(72) Inventors: Igor Berlin, Potomac, MD (US); Dan Harris, Hickory, NC (US); Michael Sauer, Corning, NY (US)

(73) Assignee: Corning Optical Communications LLC, Hickory, NC (US)

( * ) Notice: Subject to any disclaimer, the term of this patent is extended or adjusted under 35 U.S.C. 154(b) by 13 days.

(21) Appl. No.: 14/664,305

(22) Filed: Mar. 20, 2015

(65) Prior Publication Data

US 2015/0195038 A1 Jul. 9, 2015

Related U.S. Application Data

(63) Continuation of application No. 13/762,432, filed on Feb. 8, 2013, now Pat. No. 9,037,143, which is a
(Continued)

(51) Int. Cl.
*H04B 10/00* (2013.01)
*H04B 3/36* (2006.01)
(Continued)

(52) U.S. Cl.
CPC . *H04B 10/25753* (2013.01); *H04B 10/25758* (2013.01); *H04W 72/04* (2013.01); *H04W 16/26* (2013.01); *H04W 88/085* (2013.01)

(58) Field of Classification Search
CPC ....... H04B 10/25753; H04B 10/25758; H04W 16/26; H04W 72/04; H04W 88/085
(Continued)

(56) References Cited

U.S. PATENT DOCUMENTS 4,365,865 A 12/1982 Stiles
4,867,527 A 9/1989 Dotti et al.
(Continued)

FOREIGN PATENT DOCUMENTS

AU 645192 B2 1/1994
AU 731180 B2 3/2001
(Continued)

OTHER PUBLICATIONS

Author Unknown, "ADC Has 3rd Generation Services Covered at CeBIT 2001," Business Wire, Mar. 20, 2001, 3 pages.
(Continued)

*Primary Examiner* — Amritbir Sandhu
(74) *Attorney, Agent, or Firm* — C. Keith Montgomery, Esq.

(57) ABSTRACT

Distributed antenna systems supporting digital data signal propagation between remote antenna clusters, and related distributed antenna systems, components and methods are disclosed. The distributed antenna systems facilitate distributing digital data signals to provide digital data services remotely to distributed remote antenna units. The digital data signals may be propagated between remote antenna units within a remote antenna cluster for digital data signals transmitted to wireless client devices in the distributed antenna system and for digital data signals received from wireless client devices in the distributed antenna system. Received digital data signals from wireless client devices can be propagated from remote antenna unit to remote antenna unit in a remote antenna cluster until the digital data signals reach a wired network device for communication over a network. The remote antenna units may be configured to support high-frequency digital data signal to support larger channel bandwidths and in turn higher data rate transfers.

32 Claims, 11 Drawing Sheets

Related U.S. Application Data continuation of application No. PCT/US2011/047821, filed on Aug. 16, 2011.

(60) Provisional application No. 61/374,026, filed on Aug. 16, 2010.

(51) Int. Cl.
  *H04B 10/2575* (2013.01)
  *H04W 72/04* (2009.01)
  *H04W 16/26* (2009.01)
  *H04W 88/08* (2009.01)

(58) Field of Classification Search
  USPC ....... 398/79, 115–118; 455/7, 8, 9, 10, 11.1,
    455/12.1, 13.1, 13.2, 13.3, 13.4, 14, 15,
    455/16, 17, 18, 19, 20, 21, 22, 23, 24, 25
  See application file for complete search history.

(56) References Cited

U.S. PATENT DOCUMENTS

| | | |
|---|---|---|
| 4,889,977 A | 12/1989 | Haydon |
| 4,896,939 A | 1/1990 | O'Brien |
| 4,916,460 A | 4/1990 | Powell |
| 4,972,505 A | 11/1990 | Isberg |
| 5,039,195 A | 8/1991 | Jenkins et al. |
| 5,042,086 A | 8/1991 | Cole et al. |
| 5,125,060 A | 6/1992 | Edmundson |
| 5,189,718 A | 2/1993 | Barrett et al. |
| 5,189,719 A | 2/1993 | Coleman et al. |
| 5,206,655 A | 4/1993 | Caille et al. |
| 5,210,812 A | 5/1993 | Nilsson et al. |
| 5,260,957 A | 11/1993 | Hakimi et al. |
| 5,263,108 A | 11/1993 | Kurokawa et al. |
| 5,267,122 A | 11/1993 | Glover et al. |
| 5,268,971 A | 12/1993 | Nilsson et al. |
| 5,280,472 A | 1/1994 | Gilhousen et al. |
| 5,295,154 A | 3/1994 | Meier et al. |
| 5,299,947 A | 4/1994 | Barnard |
| 5,301,056 A | 4/1994 | O'Neill |
| 5,339,058 A | 8/1994 | Lique |
| 5,339,184 A | 8/1994 | Tang |
| 5,377,035 A | 12/1994 | Wang et al. |
| 5,379,455 A | 1/1995 | Koschek |
| 5,400,391 A | 3/1995 | Emura et al. |
| 5,404,570 A | 4/1995 | Charas et al. |
| 5,424,864 A | 6/1995 | Emura |
| 5,428,636 A | 6/1995 | Meier |
| 5,444,564 A | 8/1995 | Newberg |
| 5,457,557 A | 10/1995 | Zarem et al. |
| 5,459,727 A | 10/1995 | Vannucci |
| 5,469,523 A | 11/1995 | Blew et al. |
| 5,499,241 A | 3/1996 | Thompson et al. |
| 5,504,746 A | 4/1996 | Meier |
| 5,519,691 A | 5/1996 | Darcie et al. |
| 5,543,000 A | 8/1996 | Lique |
| 5,544,161 A | 8/1996 | Bigham et al. |
| 5,546,443 A | 8/1996 | Raith |
| 5,553,064 A | 9/1996 | Paff et al. |
| 5,557,698 A | 9/1996 | Gareis et al. |
| 5,574,815 A | 11/1996 | Kneeland |
| 5,598,288 A | 1/1997 | Collar |
| 5,603,080 A | 2/1997 | Kallander et al. |
| 5,615,034 A | 3/1997 | Hori |
| 5,621,786 A | 4/1997 | Fischer et al. |
| 5,627,879 A | 5/1997 | Russell et al. |
| 5,640,678 A | 6/1997 | Ishikawa et al. |
| 5,642,405 A | 6/1997 | Fischer et al. |
| 5,644,622 A | 7/1997 | Russell et al. |
| 5,648,961 A | 7/1997 | Ebihara |
| 5,651,081 A | 7/1997 | Blew et al. |
| 5,657,374 A | 8/1997 | Russell et al. |
| 5,668,562 A | 9/1997 | Cutrer et al. |
| 5,677,974 A | 10/1997 | Elms et al. |
| 5,682,256 A | 10/1997 | Motley et al. |
| 5,684,799 A | 11/1997 | Bigham et al. |
| 5,689,355 A | 11/1997 | Okubo et al. |
| 5,703,602 A | 12/1997 | Casebolt |
| 5,726,984 A | 3/1998 | Kubler et al. |
| 5,774,789 A | 6/1998 | van der Kaay et al. |
| 5,790,536 A | 8/1998 | Mahany et al. |
| 5,790,606 A | 8/1998 | Dent |
| 5,802,173 A | 9/1998 | Hamilton-Piercy et al. |
| 5,802,473 A | 9/1998 | Rutledge et al. |
| 5,805,983 A | 9/1998 | Naidu et al. |
| 5,809,422 A | 9/1998 | Raleigh et al. |
| 5,812,296 A | 9/1998 | Tarusawa et al. |
| 5,818,619 A | 10/1998 | Medved et al. |
| 5,821,510 A | 10/1998 | Cohen et al. |
| 5,825,651 A | 10/1998 | Gupta et al. |
| 5,825,829 A | 10/1998 | Borazjani et al. |
| 5,832,364 A | 11/1998 | Gustafson |
| 5,838,474 A | 11/1998 | Stilling |
| 5,852,651 A | 12/1998 | Fischer et al. |
| 5,854,986 A | 12/1998 | Dorren et al. |
| 5,867,485 A | 2/1999 | Chambers et al. |
| 5,880,863 A | 3/1999 | Rideout et al. |
| 5,881,200 A | 3/1999 | Burt |
| 5,883,882 A | 3/1999 | Schwartz |
| 5,890,055 A | 3/1999 | Chu et al. |
| 5,896,568 A | 4/1999 | Tseng et al. |
| 5,903,834 A | 5/1999 | Wallstedt et al. |
| 5,910,776 A | 6/1999 | Black |
| 5,913,003 A | 6/1999 | Arroyo et al. |
| 5,917,636 A | 6/1999 | Wake et al. |
| 5,930,682 A | 7/1999 | Schwartz et al. |
| 5,936,754 A | 8/1999 | Ariyavisitakul et al. |
| 5,943,372 A | 8/1999 | Gans et al. |
| 5,946,622 A | 8/1999 | Bojeryd |
| 5,949,564 A | 9/1999 | Wake |
| 5,959,531 A | 9/1999 | Gallagher, III et al. |
| 5,960,344 A | 9/1999 | Mahany |
| 5,969,837 A | 10/1999 | Farber et al. |
| 5,982,413 A | 11/1999 | Irie et al. |
| 5,983,070 A | 11/1999 | Georges et al. |
| 5,987,303 A | 11/1999 | Dutta et al. |
| 6,005,884 A | 12/1999 | Cook et al. |
| 6,006,105 A | 12/1999 | Rostoker et al. |
| 6,014,546 A | 1/2000 | Georges et al. |
| 6,016,426 A | 1/2000 | Bodell |
| 6,023,625 A | 2/2000 | Myers, Jr. |
| 6,046,992 A | 4/2000 | Meier et al. |
| 6,067,053 A | 5/2000 | Runyon et al. |
| 6,078,622 A | 6/2000 | Boytim et al. |
| 6,088,381 A | 7/2000 | Myers, Jr. |
| 6,112,086 A | 8/2000 | Wala |
| 6,124,957 A | 9/2000 | Goel et al. |
| 6,127,917 A | 10/2000 | Tuttle |
| 6,128,470 A | 10/2000 | Naidu et al. |
| 6,148,041 A | 11/2000 | Dent |
| 6,150,921 A | 11/2000 | Werb et al. |
| 6,157,810 A | 12/2000 | Georges et al. |
| 6,219,553 B1 | 4/2001 | Panasik |
| 6,222,503 B1 | 4/2001 | Gietema et al. |
| 6,223,021 B1 * | 4/2001 | Silvia ............... H04W 88/085 455/313 |
| 6,232,870 B1 | 5/2001 | Garber et al. |
| 6,236,789 B1 | 5/2001 | Fitz |
| 6,240,274 B1 | 5/2001 | Izadpanah |
| 6,268,946 B1 | 7/2001 | Larkin et al. |
| 6,292,673 B1 | 9/2001 | Maeda et al. |
| 6,301,240 B1 | 10/2001 | Slabinski et al. |
| 6,314,163 B1 | 11/2001 | Acampora |
| 6,317,599 B1 | 11/2001 | Rappaport et al. |
| 6,323,980 B1 | 11/2001 | Bloom |
| 6,324,391 B1 | 11/2001 | Bodell |
| 6,330,244 B1 | 12/2001 | Swartz et al. |
| 6,334,219 B1 | 12/2001 | Hill et al. |
| 6,337,754 B1 | 1/2002 | Imajo |
| 6,353,406 B1 | 3/2002 | Lanzl et al. |
| 6,353,600 B1 | 3/2002 | Schwartz et al. |
| 6,356,374 B1 | 3/2002 | Farhan |
| 6,359,714 B1 | 3/2002 | Imajo |

(56) References Cited

U.S. PATENT DOCUMENTS

| | | |
|---|---|---|
| 6,373,611 B1 | 4/2002 | Farhan et al. |
| 6,374,078 B1 | 4/2002 | Williams et al. |
| 6,374,124 B1 | 4/2002 | Slabinski |
| 6,374,311 B1 | 4/2002 | Mahany et al. |
| 6,389,010 B1 | 5/2002 | Kubler et al. |
| 6,392,770 B1 | 5/2002 | Sasai et al. |
| 6,405,018 B1 | 6/2002 | Reudink et al. |
| 6,405,058 B2 | 6/2002 | Bobier |
| 6,405,308 B1 | 6/2002 | Gupta et al. |
| 6,438,301 B1 | 8/2002 | Johnson et al. |
| 6,438,371 B1 | 8/2002 | Fujise et al. |
| 6,452,915 B1 | 9/2002 | Jorgensen |
| 6,477,154 B1 | 11/2002 | Cheong et al. |
| 6,480,702 B1 | 11/2002 | Sabat, Jr. |
| 6,486,907 B1 | 11/2002 | Farber et al. |
| 6,496,290 B1 | 12/2002 | Lee |
| 6,501,768 B2 | 12/2002 | Marin et al. |
| 6,501,942 B1 | 12/2002 | Weissman et al. |
| 6,501,965 B1 | 12/2002 | Lucidarme |
| 6,504,636 B1 | 1/2003 | Seto et al. |
| 6,512,478 B1 | 1/2003 | Chien |
| 6,519,395 B1 | 2/2003 | Bevan et al. |
| 6,523,177 B1 | 2/2003 | Brown |
| 6,525,855 B1 | 2/2003 | Westbrook et al. |
| 6,526,264 B2 | 2/2003 | Sugar et al. |
| 6,549,772 B1 | 4/2003 | Chavez et al. |
| 6,556,551 B1 | 4/2003 | Schwartz |
| 6,560,441 B1 | 5/2003 | Sabat, Jr. et al. |
| 6,577,794 B1 | 6/2003 | Currie et al. |
| 6,577,801 B2 | 6/2003 | Broderick et al. |
| 6,580,402 B2 | 6/2003 | Navarro et al. |
| 6,580,905 B1 | 6/2003 | Naidu et al. |
| 6,580,918 B1 | 6/2003 | Leickel et al. |
| 6,583,763 B2 | 6/2003 | Judd |
| 6,594,496 B2 | 7/2003 | Schwartz |
| 6,597,325 B2 | 7/2003 | Judd et al. |
| 6,606,430 B2 | 8/2003 | Bartur et al. |
| 6,615,074 B2 | 9/2003 | Mickle et al. |
| 6,634,811 B1 | 10/2003 | Gertel et al. |
| 6,636,747 B2 | 10/2003 | Harada et al. |
| 6,640,103 B1 | 10/2003 | Inman et al. |
| 6,643,437 B1 | 11/2003 | Park |
| 6,652,158 B2 | 11/2003 | Bartur et al. |
| 6,654,616 B1 | 11/2003 | Pope, Jr. et al. |
| 6,657,535 B1 | 12/2003 | Magbie et al. |
| 6,658,269 B1 | 12/2003 | Golemon et al. |
| 6,670,930 B2 | 12/2003 | Navarro |
| 6,675,294 B1 | 1/2004 | Gupta et al. |
| 6,687,437 B1 | 2/2004 | Starnes et al. |
| 6,690,328 B2 | 2/2004 | Judd |
| 6,697,603 B1 | 2/2004 | Lovinggood et al. |
| 6,704,298 B1 | 3/2004 | Matsumiya et al. |
| 6,704,545 B1 | 3/2004 | Wala |
| 6,704,579 B2 | 3/2004 | Woodhead et al. |
| 6,710,366 B1 | 3/2004 | Lee et al. |
| 6,731,880 B2 | 5/2004 | Westbrook et al. |
| 6,758,913 B1 | 7/2004 | Tunney et al. |
| 6,763,226 B1 | 7/2004 | McZeal, Jr. |
| 6,771,862 B2 | 8/2004 | Karnik et al. |
| 6,771,933 B1 | 8/2004 | Eng et al. |
| 6,784,802 B1 | 8/2004 | Stanescu |
| 6,785,558 B1 | 8/2004 | Stratford et al. |
| 6,788,666 B1 | 9/2004 | Linebarger et al. |
| 6,801,767 B1 | 10/2004 | Schwartz et al. |
| 6,807,374 B1 | 10/2004 | Imajo et al. |
| 6,812,824 B1 | 11/2004 | Goldinger et al. |
| 6,812,905 B2 | 11/2004 | Thomas et al. |
| 6,826,164 B2 | 11/2004 | Mani et al. |
| 6,826,165 B1 | 11/2004 | Meier et al. |
| 6,826,337 B2 | 11/2004 | Linnell |
| 6,831,901 B2 | 12/2004 | Millar |
| 6,842,433 B2 | 1/2005 | West et al. |
| 6,842,459 B1 | 1/2005 | Binder |
| 6,847,856 B1 | 1/2005 | Bohannon |
| 6,850,510 B2 | 2/2005 | Kubler et al. |
| 6,865,390 B2 | 3/2005 | Goss et al. |
| 6,873,823 B2 | 3/2005 | Hasarchi et al. |
| 6,876,056 B2 | 4/2005 | Tilmans et al. |
| 6,876,852 B1 | 4/2005 | Li et al. |
| 6,879,290 B1 | 4/2005 | Toutain et al. |
| 6,882,833 B2 | 4/2005 | Nguyen |
| 6,883,710 B2 | 4/2005 | Chung |
| 6,885,846 B1 | 4/2005 | Panasik et al. |
| 6,889,060 B2 | 5/2005 | Fernando et al. |
| 6,895,253 B1 | 5/2005 | Carloni et al. |
| 6,909,399 B1 | 6/2005 | Zegelin et al. |
| 6,915,058 B2 | 7/2005 | Pons |
| 6,919,858 B2 | 7/2005 | Rofougaran |
| 6,920,330 B2 | 7/2005 | Caronni et al. |
| 6,924,997 B2 | 8/2005 | Chen et al. |
| 6,930,987 B1 | 8/2005 | Fukuda et al. |
| 6,931,183 B2 | 8/2005 | Panak et al. |
| 6,933,849 B2 | 8/2005 | Sawyer |
| 6,940,916 B1 | 9/2005 | Warner et al. |
| 6,961,312 B2 | 11/2005 | Kubler et al. |
| 6,963,289 B2 | 11/2005 | Aljadeff et al. |
| 6,963,552 B2 | 11/2005 | Sabat, Jr. et al. |
| 6,965,718 B2 | 11/2005 | Koertel |
| 6,968,107 B2 | 11/2005 | Belardi et al. |
| 6,970,652 B2 | 11/2005 | Zhang et al. |
| 6,973,243 B2 | 12/2005 | Koyasu et al. |
| 6,974,262 B1 | 12/2005 | Rickenbach |
| 7,006,465 B2 | 2/2006 | Toshimitsu et al. |
| 7,013,087 B2 | 3/2006 | Suzuki et al. |
| 7,015,826 B1 | 3/2006 | Chan et al. |
| 7,016,308 B1 | 3/2006 | Gallagher |
| 7,020,451 B2 | 3/2006 | Sugar et al. |
| 7,020,473 B2 | 3/2006 | Splett |
| 7,024,166 B2 | 4/2006 | Wallace et al. |
| 7,035,512 B2 | 4/2006 | Van Bijsterveld |
| 7,035,671 B2 | 4/2006 | Solum |
| 7,039,399 B2 | 5/2006 | Fischer |
| 7,047,028 B2 | 5/2006 | Cagenius |
| 7,050,017 B2 | 5/2006 | King et al. |
| 7,053,838 B2 | 5/2006 | Judd |
| 7,054,513 B2 | 5/2006 | Herz et al. |
| 7,072,586 B2 | 7/2006 | Aburakawa et al. |
| 7,082,320 B2 | 7/2006 | Kattukaran et al. |
| 7,084,769 B2 | 8/2006 | Bauer et al. |
| 7,092,710 B1 | 8/2006 | Stoter et al. |
| 7,093,985 B2 | 8/2006 | Lord et al. |
| 7,103,312 B2 | 9/2006 | Judd et al. |
| 7,103,377 B2 | 9/2006 | Bauman et al. |
| 7,106,931 B2 | 9/2006 | Sutehall et al. |
| 7,110,381 B1 * | 9/2006 | O'Sullivan ......... H04B 7/0814 370/338 |
| 7,114,859 B1 | 10/2006 | Tuohimaa et al. |
| 7,127,175 B2 | 10/2006 | Mani et al. |
| 7,127,176 B2 | 10/2006 | Sasaki |
| 7,133,697 B2 | 11/2006 | Judd et al. |
| 7,142,503 B1 | 11/2006 | Grant et al. |
| 7,142,535 B2 | 11/2006 | Kubler et al. |
| 7,160,032 B2 | 1/2007 | Nagashima et al. |
| 7,181,206 B2 | 2/2007 | Pedersen |
| 7,199,443 B2 | 4/2007 | Elsharawy |
| 7,200,305 B2 | 4/2007 | Dion et al. |
| 7,200,391 B2 | 4/2007 | Chung et al. |
| 7,228,072 B2 | 6/2007 | Mickelsson et al. |
| 7,245,603 B1 | 7/2007 | Lucidarme et al. |
| 7,257,328 B2 | 8/2007 | Levinson et al. |
| 7,263,293 B2 | 8/2007 | Ommodt et al. |
| 7,269,311 B2 | 9/2007 | Kim et al. |
| 7,277,679 B1 * | 10/2007 | Barratt ............... H04B 7/084 375/347 |
| 7,286,507 B1 | 10/2007 | Oh et al. |
| 7,286,843 B2 | 10/2007 | Scheck |
| 7,286,854 B2 | 10/2007 | Ferrato et al. |
| 7,295,119 B2 | 11/2007 | Rappaport et al. |
| 7,310,430 B1 | 12/2007 | Mallya et al. |
| 7,313,415 B2 | 12/2007 | Wake et al. |
| 7,315,735 B2 | 1/2008 | Graham |
| 7,324,730 B2 | 1/2008 | Varkey et al. |
| 7,343,164 B2 | 3/2008 | Kallstenius |
| 7,349,633 B2 | 3/2008 | Lee et al. |

(56) References Cited

U.S. PATENT DOCUMENTS

| | | | |
|---|---|---|---|
| 7,359,408 B2 | 4/2008 | Kim | |
| 7,359,674 B2 | 4/2008 | Markki et al. | |
| 7,366,150 B2 | 4/2008 | Lee et al. | |
| 7,366,151 B2 | 4/2008 | Kubler et al. | |
| 7,369,526 B2 | 5/2008 | Lechleider et al. | |
| 7,379,669 B2 | 5/2008 | Kim | |
| 7,392,029 B2 | 6/2008 | Pronkine | |
| 7,394,883 B2 | 7/2008 | Funakubo et al. | |
| 7,403,156 B2 | 7/2008 | Coppi et al. | |
| 7,409,159 B2 | 8/2008 | Izadpanah | |
| 7,412,224 B2 | 8/2008 | Kotola et al. | |
| 7,424,228 B1 | 9/2008 | Williams et al. | |
| 7,442,679 B2 | 10/2008 | Stolte et al. | |
| 7,444,051 B2 | 10/2008 | Tatat et al. | |
| 7,450,853 B2 | 11/2008 | Kim et al. | |
| 7,450,854 B2 | 11/2008 | Lee et al. | |
| 7,451,365 B2 | 11/2008 | Wang et al. | |
| 7,457,646 B2 | 11/2008 | Mahany et al. | |
| 7,460,507 B2 | 12/2008 | Kubler et al. | |
| 7,460,829 B2 | 12/2008 | Utsumi et al. | |
| 7,460,831 B2 | 12/2008 | Hasarchi | |
| 7,466,925 B2 | 12/2008 | Iannelli | |
| 7,469,105 B2 | 12/2008 | Wake et al. | |
| 7,477,597 B2 | 1/2009 | Segel | |
| 7,483,504 B2 | 1/2009 | Shapira et al. | |
| 7,493,129 B1 | 2/2009 | Mostafa et al. | |
| 7,496,070 B2 | 2/2009 | Vesuna | |
| 7,496,384 B2 | 2/2009 | Seto et al. | |
| 7,522,552 B2 | 4/2009 | Fein et al. | |
| 7,542,452 B2 | 6/2009 | Penumetsa | |
| 7,548,695 B2 | 6/2009 | Wake | |
| 7,551,641 B2 | 6/2009 | Pirzada et al. | |
| 7,552,246 B2 | 6/2009 | Mahany et al. | |
| 7,557,758 B2 | 7/2009 | Rofougaran | |
| 7,580,384 B2 | 8/2009 | Kubler et al. | |
| 7,586,861 B2 | 9/2009 | Kubler et al. | |
| 7,590,354 B2 | 9/2009 | Sauer et al. | |
| 7,599,420 B2 | 10/2009 | Forenza et al. | |
| 7,606,594 B2 | 10/2009 | Jesse et al. | |
| 7,627,250 B2 | 12/2009 | George et al. | |
| 7,630,690 B2 | 12/2009 | Kaewell, Jr. et al. | |
| 7,633,934 B2 | 12/2009 | Kubler et al. | |
| 7,646,743 B2 | 1/2010 | Kubler et al. | |
| 7,646,777 B2 | 1/2010 | Hicks, III et al. | |
| 7,653,397 B2 | 1/2010 | Pernu et al. | |
| 7,668,153 B2 | 2/2010 | Zavadsky | |
| 7,668,565 B2 | 2/2010 | Ylänen et al. | |
| 7,684,709 B2 | 3/2010 | Ray et al. | |
| 7,688,811 B2 | 3/2010 | Kubler et al. | |
| 7,693,486 B2 | 4/2010 | Kasslin et al. | |
| 7,697,467 B2 | 4/2010 | Kubler et al. | |
| 7,715,375 B2 | 5/2010 | Kubler et al. | |
| 7,715,466 B1 | 5/2010 | Oh et al. | |
| 7,751,374 B2 | 7/2010 | Donovan | |
| 7,751,838 B2 | 7/2010 | Ramesh et al. | |
| 7,760,703 B2 | 7/2010 | Kubler et al. | |
| 7,761,093 B2 | 7/2010 | Sabat, Jr. et al. | |
| 7,764,978 B1 | 7/2010 | West | |
| 7,768,951 B2 | 8/2010 | Kubler et al. | |
| 7,773,573 B2 | 8/2010 | Chung et al. | |
| 7,778,603 B2 | 8/2010 | Palin et al. | |
| 7,783,263 B2 | 8/2010 | Sperlich et al. | |
| 7,787,854 B2 | 8/2010 | Conyers et al. | |
| 7,805,073 B2 | 9/2010 | Sabat, Jr. et al. | |
| 7,809,012 B2 | 10/2010 | Ruuska et al. | |
| 7,817,958 B2 | 10/2010 | Scheinert et al. | |
| 7,817,969 B2 | 10/2010 | Castaneda et al. | |
| 7,835,328 B2 | 11/2010 | Stephens et al. | |
| 7,844,273 B2 | 11/2010 | Scheinert | |
| 7,848,316 B2 | 12/2010 | Kubler et al. | |
| 7,848,731 B1 | 12/2010 | Dianda et al. | |
| 7,853,234 B2 | 12/2010 | Afsahi | |
| 7,870,321 B2 | 1/2011 | Rofougaran | |
| 7,881,755 B1 | 2/2011 | Mishra et al. | |
| 7,894,423 B2 | 2/2011 | Kubler et al. | |
| 7,899,007 B2 | 3/2011 | Kubler et al. | |
| 7,907,972 B2 | 3/2011 | Walton et al. | |
| 7,912,043 B2 | 3/2011 | Kubler et al. | |
| 7,916,706 B2 | 3/2011 | Kubler et al. | |
| 7,917,145 B2 | 3/2011 | Mahany et al. | |
| 7,920,553 B2 | 4/2011 | Kubler et al. | |
| 7,920,858 B2 | 4/2011 | Sabat, Jr. et al. | |
| 7,924,783 B1 | 4/2011 | Mahany et al. | |
| 7,929,940 B1 | 4/2011 | Dianda et al. | |
| 7,936,713 B2 | 5/2011 | Kubler et al. | |
| 7,948,897 B2 | 5/2011 | Stuart et al. | |
| 7,949,364 B2 | 5/2011 | Kasslin et al. | |
| 7,957,777 B1 | 6/2011 | Vu et al. | |
| 7,962,042 B2 | 6/2011 | Deas | |
| 7,962,176 B2 | 6/2011 | Li et al. | |
| 7,969,009 B2 | 6/2011 | Chandrasekaran | |
| 7,969,911 B2 | 6/2011 | Mahany et al. | |
| 7,990,925 B2 | 8/2011 | Tinnakornsrisuphap et al. | |
| 7,996,020 B1 | 8/2011 | Chhabra | |
| 8,005,152 B2 | 8/2011 | Wegener | |
| 8,010,116 B2 * | 8/2011 | Scheinert | H04B 7/0691 370/328 |
| 8,018,907 B2 | 9/2011 | Kubler et al. | |
| 8,036,308 B2 | 10/2011 | Rofougaran | |
| 8,082,353 B2 | 12/2011 | Huber et al. | |
| 8,086,192 B2 | 12/2011 | Rofougaran et al. | |
| 8,107,464 B2 | 1/2012 | Schmidt et al. | |
| 8,135,102 B2 | 3/2012 | Wiwel et al. | |
| 8,155,525 B2 | 4/2012 | Cox | |
| 8,174,428 B2 | 5/2012 | Wegener | |
| 8,208,434 B2 * | 6/2012 | Sayana | H04B 7/024 370/329 |
| 8,213,401 B2 | 7/2012 | Fischer et al. | |
| 8,270,387 B2 | 9/2012 | Cannon et al. | |
| 8,274,929 B2 | 9/2012 | Schmidt et al. | |
| 8,279,800 B2 | 10/2012 | Schmidt et al. | |
| 8,290,483 B2 | 10/2012 | Sabat, Jr. et al. | |
| 8,306,563 B2 | 11/2012 | Zavadsky et al. | |
| 8,346,091 B2 | 1/2013 | Kummetz et al. | |
| 8,346,160 B2 * | 1/2013 | Kummetz | H04B 7/15535 455/11.1 |
| 8,346,278 B2 | 1/2013 | Wala et al. | |
| 8,422,884 B2 | 4/2013 | Mao | |
| 8,428,510 B2 | 4/2013 | Stratford et al. | |
| 8,457,562 B2 | 6/2013 | Zavadksy et al. | |
| 8,462,683 B2 | 6/2013 | Uyehara et al. | |
| 8,467,823 B2 | 6/2013 | Seki et al. | |
| 8,472,579 B2 | 6/2013 | Uyehara et al. | |
| 8,509,215 B2 | 8/2013 | Stuart | |
| 8,509,850 B2 | 8/2013 | Zavadsky et al. | |
| 8,526,970 B2 | 9/2013 | Wala et al. | |
| 8,532,242 B2 | 9/2013 | Fischer et al. | |
| 8,532,566 B2 * | 9/2013 | Dussmann | H04B 7/15535 455/11.1 |
| 8,548,526 B2 | 10/2013 | Schmidt et al. | |
| 8,583,100 B2 | 11/2013 | Koziy et al. | |
| 8,626,245 B2 | 1/2014 | Zavadsky et al. | |
| 8,634,766 B2 | 1/2014 | Hobbs et al. | |
| 8,681,917 B2 | 3/2014 | McAllister et al. | |
| 8,682,338 B2 | 3/2014 | Lemson et al. | |
| 8,693,342 B2 | 4/2014 | Uyehara et al. | |
| 8,694,034 B2 | 4/2014 | Notargiacomo | |
| 8,699,982 B2 | 4/2014 | Singh | |
| 8,737,300 B2 | 5/2014 | Stapleton et al. | |
| 8,737,454 B2 | 5/2014 | Wala et al. | |
| 8,743,718 B2 | 6/2014 | Grenier et al. | |
| 8,743,756 B2 | 6/2014 | Uyehara et al. | |
| 8,792,933 B2 | 7/2014 | Chen | |
| 8,837,659 B2 | 9/2014 | Uyehara et al. | |
| 8,837,940 B2 | 9/2014 | Smith et al. | |
| 8,908,607 B2 | 12/2014 | Kummetz et al. | |
| 8,929,288 B2 | 1/2015 | Stewart et al. | |
| 8,948,816 B2 | 2/2015 | Fischer et al. | |
| 8,958,789 B2 | 2/2015 | Bauman et al. | |
| 8,976,067 B2 | 3/2015 | Fischer | |
| 9,001,811 B2 | 4/2015 | Wala et al. | |
| 9,037,143 B2 * | 5/2015 | Berlin | H04B 10/25758 455/450 |
| 9,042,732 B2 | 5/2015 | Cune et al. | |

(56) References Cited

U.S. PATENT DOCUMENTS

| | | | |
|---|---|---|---|
| 9,270,374 B2 | 2/2016 | Cune et al. | |
| 9,325,429 B2 | 4/2016 | Berlin et al. | |
| 9,525,488 B2 | 12/2016 | Beaman et al. | |
| 9,602,176 B2* | 3/2017 | Schmid | H04B 7/0413 |
| 9,642,102 B2* | 5/2017 | Machida | H04W 52/46 |
| 9,806,797 B2* | 10/2017 | Berlin | H04B 7/2606 |
| 2001/0000621 A1* | 5/2001 | Mitsuda | G02B 6/4246 257/81 |
| 2001/0036163 A1 | 11/2001 | Sabat, Jr. et al. | |
| 2001/0053011 A1 | 12/2001 | Imajo | |
| 2002/0003645 A1 | 1/2002 | Kim et al. | |
| 2002/0012336 A1 | 1/2002 | Hughes et al. | |
| 2002/0012495 A1 | 1/2002 | Sasai et al. | |
| 2002/0031113 A1 | 3/2002 | Dodds et al. | |
| 2002/0048071 A1 | 4/2002 | Suzuki et al. | |
| 2002/0055371 A1 | 5/2002 | Arnon et al. | |
| 2002/0075906 A1 | 6/2002 | Cole et al. | |
| 2002/0090915 A1 | 7/2002 | Komara et al. | |
| 2002/0092347 A1 | 7/2002 | Niekerk et al. | |
| 2002/0111149 A1 | 8/2002 | Shoki | |
| 2002/0111192 A1 | 8/2002 | Thomas et al. | |
| 2002/0114038 A1 | 8/2002 | Arnon et al. | |
| 2002/0123365 A1 | 9/2002 | Thorson et al. | |
| 2002/0126967 A1 | 9/2002 | Panak et al. | |
| 2002/0130778 A1 | 9/2002 | Nicholson | |
| 2002/0176354 A1* | 11/2002 | Chiodini | H04L 27/2662 370/208 |
| 2002/0181668 A1 | 12/2002 | Masoian et al. | |
| 2002/0190845 A1 | 12/2002 | Moore | |
| 2003/0007214 A1 | 1/2003 | Aburakawa et al. | |
| 2003/0016418 A1 | 1/2003 | Westbrook et al. | |
| 2003/0045284 A1 | 3/2003 | Copley et al. | |
| 2003/0078052 A1 | 4/2003 | Atias et al. | |
| 2003/0078074 A1 | 4/2003 | Sesay et al. | |
| 2003/0141962 A1 | 7/2003 | Barink | |
| 2003/0161637 A1 | 8/2003 | Yamamoto et al. | |
| 2003/0165287 A1 | 9/2003 | Krill et al. | |
| 2003/0174099 A1 | 9/2003 | Bauer et al. | |
| 2003/0209601 A1 | 11/2003 | Chung | |
| 2004/0001719 A1 | 1/2004 | Sasaki | |
| 2004/0008114 A1 | 1/2004 | Sawyer | |
| 2004/0017785 A1 | 1/2004 | Zelst | |
| 2004/0037300 A1 | 2/2004 | Lehr et al. | |
| 2004/0041714 A1 | 3/2004 | Forster | |
| 2004/0043764 A1 | 3/2004 | Bigham et al. | |
| 2004/0047313 A1 | 3/2004 | Rumpf et al. | |
| 2004/0049321 A1 | 3/2004 | Lehr et al. | |
| 2004/0078151 A1 | 4/2004 | Aljadeff et al. | |
| 2004/0100930 A1 | 5/2004 | Shapira et al. | |
| 2004/0105435 A1 | 6/2004 | Morioka | |
| 2004/0106435 A1 | 6/2004 | Bauman et al. | |
| 2004/0110469 A1 | 6/2004 | Judd et al. | |
| 2004/0126068 A1 | 7/2004 | Van Bijsterveld | |
| 2004/0131125 A1* | 7/2004 | Sanderford, Jr. | H04L 5/06 375/261 |
| 2004/0146020 A1 | 7/2004 | Kubler et al. | |
| 2004/0149736 A1 | 8/2004 | Clothier | |
| 2004/0151164 A1 | 8/2004 | Kubler et al. | |
| 2004/0151503 A1 | 8/2004 | Kashima et al. | |
| 2004/0157623 A1 | 8/2004 | Splett | |
| 2004/0160912 A1 | 8/2004 | Kubler et al. | |
| 2004/0160913 A1 | 8/2004 | Kubler et al. | |
| 2004/0162115 A1 | 8/2004 | Smith et al. | |
| 2004/0162116 A1 | 8/2004 | Han et al. | |
| 2004/0165573 A1 | 8/2004 | Kubler et al. | |
| 2004/0175173 A1 | 9/2004 | Deas | |
| 2004/0198451 A1 | 10/2004 | Varghese | |
| 2004/0202257 A1 | 10/2004 | Mehta et al. | |
| 2004/0203339 A1* | 10/2004 | Bauman | H04B 7/0842 455/7 |
| 2004/0203704 A1 | 10/2004 | Ommodt et al. | |
| 2004/0203846 A1 | 10/2004 | Caronni et al. | |
| 2004/0204109 A1 | 10/2004 | Hoppenstein | |
| 2004/0208526 A1 | 10/2004 | Mibu | |
| 2004/0218873 A1 | 11/2004 | Nagashima et al. | |
| 2004/0230846 A1 | 11/2004 | Mancey et al. | |
| 2004/0233877 A1 | 11/2004 | Lee et al. | |
| 2004/0258105 A1 | 12/2004 | Spathas et al. | |
| 2005/0052287 A1 | 3/2005 | Whitesmith et al. | |
| 2005/0058451 A1 | 3/2005 | Ross | |
| 2005/0068179 A1 | 3/2005 | Roesner | |
| 2005/0076982 A1 | 4/2005 | Metcalf et al. | |
| 2005/0078006 A1 | 4/2005 | Hutchins et al. | |
| 2005/0093679 A1 | 5/2005 | Zai et al. | |
| 2005/0099343 A1 | 5/2005 | Asrani et al. | |
| 2005/0116821 A1 | 6/2005 | Wilsey et al. | |
| 2005/0141545 A1 | 6/2005 | Fein et al. | |
| 2005/0143077 A1 | 6/2005 | Charbonneau | |
| 2005/0147071 A1 | 7/2005 | Karaoguz et al. | |
| 2005/0148306 A1 | 7/2005 | Hiddink | |
| 2005/0159108 A1 | 7/2005 | Fletcher et al. | |
| 2005/0174236 A1 | 8/2005 | Brookner | |
| 2005/0201761 A1 | 9/2005 | Bartur et al. | |
| 2005/0219050 A1 | 10/2005 | Martin | |
| 2005/0220458 A1 | 10/2005 | Kupershmidt et al. | |
| 2005/0224585 A1 | 10/2005 | Durrant et al. | |
| 2005/0226625 A1 | 10/2005 | Wake et al. | |
| 2005/0232636 A1 | 10/2005 | Durrant et al. | |
| 2005/0242188 A1 | 11/2005 | Vesuna | |
| 2005/0252971 A1 | 11/2005 | Howarth et al. | |
| 2005/0266797 A1 | 12/2005 | Utsumi et al. | |
| 2005/0266854 A1 | 12/2005 | Niiho et al. | |
| 2005/0269930 A1 | 12/2005 | Shimizu et al. | |
| 2005/0271396 A1 | 12/2005 | Iannelli | |
| 2006/0002326 A1 | 1/2006 | Vesuna | |
| 2006/0014548 A1 | 1/2006 | Bolin et al. | |
| 2006/0017633 A1 | 1/2006 | Pronkine | |
| 2006/0019604 A1 | 1/2006 | Hasarchi | |
| 2006/0045054 A1 | 3/2006 | Utsumi et al. | |
| 2006/0053324 A1 | 3/2006 | Giat et al. | |
| 2006/0062579 A1 | 3/2006 | Kim et al. | |
| 2006/0079290 A1 | 4/2006 | Seto et al. | |
| 2006/0094470 A1* | 5/2006 | Wake | H04W 88/085 455/562.1 |
| 2006/0104643 A1 | 5/2006 | Lee et al. | |
| 2006/0159388 A1 | 7/2006 | Kawase et al. | |
| 2006/0182446 A1 | 8/2006 | Kim et al. | |
| 2006/0182449 A1 | 8/2006 | Iannelli et al. | |
| 2006/0189354 A1 | 8/2006 | Lee et al. | |
| 2006/0222369 A1* | 10/2006 | Kim | H04B 10/25755 398/115 |
| 2006/0233506 A1 | 10/2006 | Noonan et al. | |
| 2006/0239630 A1 | 10/2006 | Hase et al. | |
| 2006/0267843 A1 | 11/2006 | Sakama et al. | |
| 2006/0274704 A1 | 12/2006 | Desai et al. | |
| 2007/0008939 A1 | 1/2007 | Fischer | |
| 2007/0009266 A1 | 1/2007 | Bothwell et al. | |
| 2007/0058978 A1 | 3/2007 | Lee et al. | |
| 2007/0060045 A1 | 3/2007 | Prautzsch | |
| 2007/0060055 A1 | 3/2007 | Desai et al. | |
| 2007/0071128 A1 | 3/2007 | Meir et al. | |
| 2007/0076649 A1 | 4/2007 | Lin et al. | |
| 2007/0093273 A1 | 4/2007 | Cai | |
| 2007/0149250 A1 | 6/2007 | Crozzoli et al. | |
| 2007/0157251 A1 | 7/2007 | Shrivastava et al. | |
| 2007/0166042 A1 | 7/2007 | Seeds et al. | |
| 2007/0208961 A1 | 9/2007 | Ghoshal et al. | |
| 2007/0224954 A1 | 9/2007 | Gopi | |
| 2007/0243899 A1 | 10/2007 | Hermel et al. | |
| 2007/0248358 A1 | 10/2007 | Sauer | |
| 2007/0253714 A1 | 11/2007 | Seeds et al. | |
| 2007/0257796 A1 | 11/2007 | Easton et al. | |
| 2007/0264009 A1 | 11/2007 | Sabat, Jr. et al. | |
| 2007/0274279 A1 | 11/2007 | Wood et al. | |
| 2007/0285239 A1 | 12/2007 | Easton et al. | |
| 2007/0286599 A1 | 12/2007 | Sauer et al. | |
| 2007/0297005 A1 | 12/2007 | Montierth et al. | |
| 2008/0007453 A1 | 1/2008 | Vassilakis et al. | |
| 2008/0013909 A1 | 1/2008 | Kostet et al. | |
| 2008/0013956 A1 | 1/2008 | Ware et al. | |
| 2008/0013957 A1 | 1/2008 | Akers et al. | |
| 2008/0014948 A1 | 1/2008 | Scheinert | |
| 2008/0014992 A1* | 1/2008 | Pescod | H01Q 1/246 455/562.1 |

(56) References Cited

U.S. PATENT DOCUMENTS

| | | |
|---|---|---|
| 2008/0026765 A1 | 1/2008 | Charbonneau |
| 2008/0031628 A1 | 2/2008 | Dragas et al. |
| 2008/0043714 A1 | 2/2008 | Pernu |
| 2008/0043784 A1 | 2/2008 | Wilcox |
| 2008/0056167 A1 | 3/2008 | Kim et al. |
| 2008/0058018 A1 | 3/2008 | Scheinert |
| 2008/0063387 A1 | 3/2008 | Yahata et al. |
| 2008/0080863 A1 | 4/2008 | Sauer et al. |
| 2008/0098203 A1 | 4/2008 | Master et al. |
| 2008/0118014 A1 | 5/2008 | Reunamaki et al. |
| 2008/0119198 A1 | 5/2008 | Hettstedt et al. |
| 2008/0124086 A1 | 5/2008 | Matthews |
| 2008/0124087 A1 | 5/2008 | Hartmann et al. |
| 2008/0129634 A1 | 6/2008 | Pera et al. |
| 2008/0134194 A1 | 6/2008 | Liu |
| 2008/0145061 A1 | 6/2008 | Lee et al. |
| 2008/0150514 A1 | 6/2008 | Codreanu et al. |
| 2008/0159226 A1 | 7/2008 | He et al. |
| 2008/0159744 A1 | 7/2008 | Soto et al. |
| 2008/0165720 A1* | 7/2008 | Hu .................. H04B 7/0632 370/315 |
| 2008/0166094 A1 | 7/2008 | Bookbinder et al. |
| 2008/0168283 A1 | 7/2008 | Penning |
| 2008/0181282 A1 | 7/2008 | Wala et al. |
| 2008/0194226 A1 | 8/2008 | Rivas et al. |
| 2008/0207253 A1 | 8/2008 | Jaakkola et al. |
| 2008/0212969 A1 | 9/2008 | Fasshauer et al. |
| 2008/0219670 A1 | 9/2008 | Kim et al. |
| 2008/0232799 A1 | 9/2008 | Kim |
| 2008/0247716 A1 | 10/2008 | Thomas et al. |
| 2008/0253351 A1 | 10/2008 | Pernu et al. |
| 2008/0253773 A1 | 10/2008 | Zheng |
| 2008/0260388 A1 | 10/2008 | Kim et al. |
| 2008/0261656 A1 | 10/2008 | Bella et al. |
| 2008/0268833 A1 | 10/2008 | Huang et al. |
| 2008/0273844 A1 | 11/2008 | Kewitsch |
| 2008/0279137 A1 | 11/2008 | Pernu et al. |
| 2008/0280569 A1 | 11/2008 | Hazani et al. |
| 2008/0291830 A1 | 11/2008 | Pernu et al. |
| 2008/0292322 A1 | 11/2008 | Daghighian et al. |
| 2008/0298813 A1* | 12/2008 | Song .............. H04B 10/25758 398/178 |
| 2008/0304831 A1 | 12/2008 | Miller, II et al. |
| 2008/0310848 A1 | 12/2008 | Yasuda et al. |
| 2008/0311944 A1 | 12/2008 | Hansen et al. |
| 2009/0022304 A1 | 1/2009 | Kubler et al. |
| 2009/0028087 A1 | 1/2009 | Nguyen et al. |
| 2009/0028317 A1 | 1/2009 | Ling et al. |
| 2009/0041413 A1 | 2/2009 | Hurley |
| 2009/0047023 A1* | 2/2009 | Pescod ............ H04B 10/25752 398/115 |
| 2009/0059903 A1 | 3/2009 | Kubler et al. |
| 2009/0061796 A1 | 3/2009 | Arkko et al. |
| 2009/0061939 A1 | 3/2009 | Andersson et al. |
| 2009/0073916 A1 | 3/2009 | Zhang et al. |
| 2009/0081985 A1 | 3/2009 | Rofougaran et al. |
| 2009/0086693 A1 | 4/2009 | Kennedy |
| 2009/0087181 A1 | 4/2009 | Gray |
| 2009/0088072 A1 | 4/2009 | Rofougaran et al. |
| 2009/0092394 A1 | 4/2009 | Wei et al. |
| 2009/0097855 A1 | 4/2009 | Thelen et al. |
| 2009/0135078 A1 | 5/2009 | Lindmark et al. |
| 2009/0149221 A1 | 6/2009 | Liu et al. |
| 2009/0154621 A1 | 6/2009 | Shapira et al. |
| 2009/0169163 A1 | 7/2009 | Abbott, III et al. |
| 2009/0175214 A1* | 7/2009 | Sfar .................. H04B 7/15592 370/315 |
| 2009/0180407 A1 | 7/2009 | Sabat et al. |
| 2009/0180423 A1 | 7/2009 | Kroener |
| 2009/0180426 A1 | 7/2009 | Sabat et al. |
| 2009/0218407 A1 | 9/2009 | Rofougaran |
| 2009/0218657 A1 | 9/2009 | Rofougaran |
| 2009/0221249 A1 | 9/2009 | Aue et al. |
| 2009/0245084 A1 | 10/2009 | Moffatt et al. |
| 2009/0245153 A1 | 10/2009 | Li et al. |
| 2009/0245221 A1 | 10/2009 | Piipponen |
| 2009/0252136 A1 | 10/2009 | Mahany et al. |
| 2009/0252204 A1 | 10/2009 | Shatara et al. |
| 2009/0252205 A1 | 10/2009 | Rheinfelder et al. |
| 2009/0258652 A1 | 10/2009 | Lambert et al. |
| 2009/0285147 A1 | 11/2009 | Subasic et al. |
| 2009/0290632 A1 | 11/2009 | Wegener |
| 2009/0316609 A1* | 12/2009 | Singh .................. H04B 7/2609 370/280 |
| 2010/0002626 A1 | 1/2010 | Schmidt et al. |
| 2010/0002661 A1 | 1/2010 | Schmidt et al. |
| 2010/0009394 A1* | 1/2010 | Guo ................ G01N 33/54306 435/7.94 |
| 2010/0009694 A1* | 1/2010 | Fischer ............ H04M 3/5158 455/452.1 |
| 2010/0027443 A1 | 2/2010 | LoGalbo et al. |
| 2010/0054227 A1 | 3/2010 | Hettstedt et al. |
| 2010/0056200 A1 | 3/2010 | Tolonen |
| 2010/0067426 A1 | 3/2010 | Voschina et al. |
| 2010/0067906 A1 | 3/2010 | Adhikari et al. |
| 2010/0080154 A1 | 4/2010 | Noh et al. |
| 2010/0080182 A1 | 4/2010 | Kubler et al. |
| 2010/0083330 A1 | 4/2010 | Bernstein et al. |
| 2010/0087227 A1 | 4/2010 | Francos et al. |
| 2010/0091475 A1 | 4/2010 | Toms et al. |
| 2010/0118864 A1 | 5/2010 | Kubler et al. |
| 2010/0127937 A1 | 5/2010 | Chandrasekaran et al. |
| 2010/0134257 A1 | 6/2010 | Puleston et al. |
| 2010/0144337 A1 | 6/2010 | Dean |
| 2010/0148373 A1 | 6/2010 | Chandrasekaran |
| 2010/0150034 A1* | 6/2010 | Song ................ H04B 7/2606 370/279 |
| 2010/0156721 A1 | 6/2010 | Alamouti et al. |
| 2010/0177759 A1 | 7/2010 | Fischer et al. |
| 2010/0177760 A1 | 7/2010 | Cannon et al. |
| 2010/0188998 A1 | 7/2010 | Pernu et al. |
| 2010/0189439 A1 | 7/2010 | Novak et al. |
| 2010/0190509 A1 | 7/2010 | Davis |
| 2010/0196013 A1 | 8/2010 | Franklin |
| 2010/0202326 A1 | 8/2010 | Rofougaran et al. |
| 2010/0202356 A1 | 8/2010 | Fischer et al. |
| 2010/0208777 A1 | 8/2010 | Ogaz |
| 2010/0215028 A1 | 8/2010 | Fischer |
| 2010/0225413 A1 | 9/2010 | Rofougaran et al. |
| 2010/0225556 A1 | 9/2010 | Rofougaran et al. |
| 2010/0225557 A1 | 9/2010 | Rofougaran et al. |
| 2010/0232323 A1 | 9/2010 | Kubler et al. |
| 2010/0246558 A1 | 9/2010 | Harel |
| 2010/0255774 A1 | 10/2010 | Kenington |
| 2010/0258949 A1 | 10/2010 | Henderson et al. |
| 2010/0260063 A1 | 10/2010 | Kubler et al. |
| 2010/0278530 A1* | 11/2010 | Kummetz ........... H04W 88/085 398/41 |
| 2010/0290355 A1 | 11/2010 | Roy et al. |
| 2010/0290787 A1 | 11/2010 | Cox |
| 2010/0291949 A1 | 11/2010 | Shapira et al. |
| 2010/0296458 A1 | 11/2010 | Wala et al. |
| 2010/0296816 A1* | 11/2010 | Larsen ............. H04B 10/25754 398/116 |
| 2010/0309049 A1 | 12/2010 | Reunamäki et al. |
| 2010/0311472 A1 | 12/2010 | Rofougaran et al. |
| 2010/0311480 A1 | 12/2010 | Raines et al. |
| 2010/0316609 A1* | 12/2010 | Dewhurst ............ A61K 31/00 424/93.2 |
| 2010/0329161 A1 | 12/2010 | Ylanen et al. |
| 2010/0329166 A1 | 12/2010 | Mahany et al. |
| 2011/0007724 A1 | 1/2011 | Mahany et al. |
| 2011/0007733 A1 | 1/2011 | Kubler et al. |
| 2011/0008042 A1 | 1/2011 | Stewart |
| 2011/0021146 A1 | 1/2011 | Pernu |
| 2011/0021224 A1 | 1/2011 | Koskinen et al. |
| 2011/0045767 A1 | 2/2011 | Rofougaran et al. |
| 2011/0055875 A1 | 3/2011 | Zussman |
| 2011/0065450 A1 | 3/2011 | Kazmi |
| 2011/0069668 A1 | 3/2011 | Chion et al. |
| 2011/0070821 A1* | 3/2011 | Chun .................. H04B 7/155 455/7 |
| 2011/0071734 A1 | 3/2011 | Van Wiemeersch et al. |

(56) References Cited

U.S. PATENT DOCUMENTS

| | | |
|---|---|---|
| 2011/0086614 A1 | 4/2011 | Brisebois et al. |
| 2011/0105016 A1* | 5/2011 | Saito ............... H04B 7/15507 455/7 |
| 2011/0116393 A1 | 5/2011 | Hong et al. |
| 2011/0116572 A1 | 5/2011 | Lee et al. |
| 2011/0126071 A1 | 5/2011 | Han et al. |
| 2011/0135308 A1* | 6/2011 | Tarlazzi ............. H04B 7/0413 398/79 |
| 2011/0141895 A1 | 6/2011 | Zhang |
| 2011/0149879 A1 | 6/2011 | Noriega et al. |
| 2011/0158297 A1 | 6/2011 | Ding et al. |
| 2011/0158298 A1 | 6/2011 | Djadi et al. |
| 2011/0170577 A1 | 7/2011 | Anvari |
| 2011/0170619 A1 | 7/2011 | Anvari |
| 2011/0182230 A1 | 7/2011 | Ohm et al. |
| 2011/0182255 A1 | 7/2011 | Kim et al. |
| 2011/0194475 A1 | 8/2011 | Kim et al. |
| 2011/0201368 A1* | 8/2011 | Faccin ............... H04B 7/0413 455/507 |
| 2011/0204504 A1 | 8/2011 | Henderson et al. |
| 2011/0211439 A1 | 9/2011 | Manpuria et al. |
| 2011/0215901 A1 | 9/2011 | Van Wiemeersch et al. |
| 2011/0222415 A1 | 9/2011 | Ramamurthi et al. |
| 2011/0222434 A1 | 9/2011 | Chen |
| 2011/0222619 A1 | 9/2011 | Ramamurthi et al. |
| 2011/0223958 A1 | 9/2011 | Chen et al. |
| 2011/0223959 A1 | 9/2011 | Chen |
| 2011/0223960 A1 | 9/2011 | Chen et al. |
| 2011/0223961 A1 | 9/2011 | Chen et al. |
| 2011/0227795 A1 | 9/2011 | Lopez et al. |
| 2011/0236024 A1 | 9/2011 | Mao |
| 2011/0237178 A1 | 9/2011 | Seki et al. |
| 2011/0241881 A1 | 10/2011 | Badinelli |
| 2011/0243201 A1 | 10/2011 | Phillips et al. |
| 2011/0243291 A1* | 10/2011 | McAllister .......... H04J 3/0658 375/376 |
| 2011/0244887 A1 | 10/2011 | Dupray et al. |
| 2011/0256878 A1 | 10/2011 | Zhu et al. |
| 2011/0268033 A1 | 11/2011 | Boldi et al. |
| 2011/0268452 A1 | 11/2011 | Beamon et al. |
| 2011/0274021 A1 | 11/2011 | He et al. |
| 2011/0281536 A1 | 11/2011 | Lee et al. |
| 2011/0316755 A1 | 12/2011 | Ayatollahi et al. |
| 2012/0106657 A1 | 5/2012 | Fischer et al. |
| 2012/0140690 A1* | 6/2012 | Choi ..................... G01S 19/03 370/311 |
| 2012/0177026 A1 | 7/2012 | Uyehara et al. |
| 2012/0263098 A1* | 10/2012 | Takahashi ............ H04B 7/155 370/315 |
| 2012/0307719 A1* | 12/2012 | Nakasato ............. H04B 7/155 370/315 |
| 2012/0314797 A1 | 12/2012 | Kummetz et al. |
| 2012/0314813 A1* | 12/2012 | Loyez .................. H04B 1/24 375/322 |
| 2012/0322477 A1* | 12/2012 | Kang .................. H04B 7/022 455/501 |
| 2013/0012195 A1 | 1/2013 | Sabat, Jr. et al. |
| 2013/0017863 A1* | 1/2013 | Kummetz ............. H04W 16/04 455/562.1 |
| 2013/0040676 A1* | 2/2013 | Kang ................. H04B 7/0495 455/509 |
| 2013/0089336 A1* | 4/2013 | Dahlfort .......... H04B 10/25759 398/115 |
| 2013/0095870 A1* | 4/2013 | Phillips ............ H04W 52/146 455/501 |
| 2013/0114963 A1* | 5/2013 | Stapleton ............ H04W 24/02 398/115 |
| 2013/0150063 A1 | 6/2013 | Berlin et al. |
| 2013/0188753 A1* | 7/2013 | Tarlazzi ............. H04B 7/024 375/299 |
| 2013/0188959 A1 | 7/2013 | Cune et al. |
| 2013/0195467 A1* | 8/2013 | Schmid ............. H04B 7/0413 398/115 |
| 2013/0210490 A1 | 8/2013 | Fischer et al. |
| 2013/0330086 A1 | 12/2013 | Berlin et al. |
| 2014/0016583 A1* | 1/2014 | Smith ................ H04W 12/06 370/329 |
| 2014/0036770 A1* | 2/2014 | Stapleton ............. H04W 36/06 370/328 |
| 2014/0050482 A1* | 2/2014 | Berlin ................ H04B 7/155 398/115 |
| 2014/0057627 A1 | 2/2014 | Hejazi et al. |
| 2014/0079112 A1* | 3/2014 | Ranson ............... H04B 7/022 375/240 |
| 2014/0105056 A1* | 4/2014 | Li .................... H04W 24/02 370/252 |
| 2014/0140225 A1 | 5/2014 | Wala |
| 2014/0146797 A1 | 5/2014 | Zavadsky et al. |
| 2014/0146905 A1 | 5/2014 | Zavadsky et al. |
| 2014/0146906 A1 | 5/2014 | Zavadsky et al. |
| 2014/0150063 A1* | 5/2014 | Bone ................... H04L 63/18 726/3 |
| 2014/0204900 A1 | 7/2014 | Kawasaki |
| 2014/0219140 A1 | 8/2014 | Uyehara et al. |
| 2014/0241224 A1 | 8/2014 | Fischer et al. |
| 2014/0243033 A1 | 8/2014 | Wala et al. |
| 2014/0269318 A1 | 9/2014 | Hasarchi et al. |
| 2014/0269859 A1 | 9/2014 | Hanson et al. |
| 2014/0287677 A1* | 9/2014 | Machida .............. H04W 52/46 455/7 |
| 2014/0308043 A1* | 10/2014 | Heidler ................ H04B 10/11 398/115 |
| 2014/0308044 A1* | 10/2014 | Heidler ................ H04B 10/11 398/115 |
| 2014/0314061 A1 | 10/2014 | Trajkovic et al. |
| 2015/0049663 A1* | 2/2015 | Mukherjee ........... H04W 16/26 370/315 |
| 2015/0098351 A1 | 4/2015 | Zavadsky et al. |
| 2015/0098372 A1 | 4/2015 | Zavadsky et al. |
| 2015/0098419 A1 | 4/2015 | Zavadsky et al. |
| 2016/0080082 A1* | 3/2016 | Lemson ............... H03F 1/3247 398/115 |
| 2016/0173201 A1* | 6/2016 | Cune ............... H04B 10/25753 398/48 |
| 2016/0219591 A1* | 7/2016 | Lee .................... H04W 40/244 |
| 2016/0295565 A1* | 10/2016 | Kim .................... H04W 72/04 |
| 2017/0047998 A1* | 2/2017 | Palanisamy ...... H04B 10/25759 |
| 2017/0244541 A1* | 8/2017 | McAllister .......... H04L 7/0087 |

FOREIGN PATENT DOCUMENTS

| | | | |
|---|---|---|---|
| CA | 2065090 | C | 2/1998 |
| CA | 2242707 | C | 9/2002 |
| CN | 1745560 | A | 3/2006 |
| CN | 101076961 | A | 11/2007 |
| CN | 101090299 | A | 12/2007 |
| CN | 101151811 | A | 3/2008 |
| CN | 101296525 | A | 10/2008 |
| CN | 101346006 | A | 1/2009 |
| CN | 101496306 | A | 7/2009 |
| CN | 101542928 | A | 9/2009 |
| CN | 201315588 | Y | 9/2009 |
| DE | 19705253 | A1 | 8/1998 |
| DE | 20104862 | U1 | 9/2001 |
| DE | 10249414 | A1 | 5/2004 |
| EP | 0391597 | A2 | 10/1990 |
| EP | 0461583 | A1 | 12/1991 |
| EP | 0477952 | A2 | 4/1992 |
| EP | 0477952 | A3 | 4/1992 |
| EP | 0714218 | A1 | 5/1996 |
| EP | 0766343 | A2 | 4/1997 |
| EP | 0687400 | B1 | 11/1998 |
| EP | 0993124 | A2 | 4/2000 |
| EP | 1056226 | A2 | 11/2000 |
| EP | 1173034 | A1 * | 1/2002 ....... H04B 10/25755 |
| EP | 1202475 | A2 | 5/2002 |
| EP | 1227605 | A2 | 7/2002 |
| EP | 1267447 | A1 | 12/2002 |
| EP | 1347584 | A2 | 9/2003 |
| EP | 1363352 | A1 | 11/2003 |
| EP | 1391897 | A1 | 2/2004 |

(56) References Cited

FOREIGN PATENT DOCUMENTS

| | | |
|---|---|---|
| EP | 1443687 A1 | 8/2004 |
| EP | 1455550 A2 | 9/2004 |
| EP | 1501206 A1 | 1/2005 |
| EP | 1503451 A1 | 2/2005 |
| EP | 1511203 A1 | 3/2005 |
| EP | 1530316 A1 | 5/2005 |
| EP | 1267447 B1 | 8/2006 |
| EP | 1693974 A1 | 8/2006 |
| EP | 1742388 A1 | 1/2007 |
| EP | 1173034 B1 | 7/2007 |
| EP | 1954019 A1 | 8/2008 |
| EP | 1968250 A1 | 9/2008 |
| EP | 1357683 B1 | 5/2009 |
| EP | 2110955 A1 * | 10/2009 ........ H04W 88/085 |
| EP | 2253980 A1 | 11/2010 |
| EP | 1570626 B1 | 11/2013 |
| GB | 2323252 A | 9/1998 |
| GB | 2366131 A | 2/2002 |
| GB | 2370170 A | 6/2002 |
| GB | 2399963 A | 9/2004 |
| GB | 2428149 A | 1/2007 |
| JP | 05260018 A | 10/1993 |
| JP | 08181661 A | 7/1996 |
| JP | 09083450 A | 3/1997 |
| JP | 09162810 A | 6/1997 |
| JP | 09200840 A | 7/1997 |
| JP | 11068675 A | 3/1999 |
| JP | 11088265 A | 3/1999 |
| JP | 2000152300 A | 5/2000 |
| JP | 2000341744 A | 12/2000 |
| JP | 2002264617 A | 9/2002 |
| JP | 2003148653 A | 5/2003 |
| JP | 2003172827 A | 6/2003 |
| JP | 2004172734 A | 6/2004 |
| JP | 2004245963 A | 9/2004 |
| JP | 2004247090 A | 9/2004 |
| JP | 2004264901 A | 9/2004 |
| JP | 2004265624 A | 9/2004 |
| JP | 2004317737 A | 11/2004 |
| JP | 2004349184 A | 12/2004 |
| JP | 2005018175 A | 1/2005 |
| JP | 2005087135 A | 4/2005 |
| JP | 2005134125 A | 5/2005 |
| JP | 2007228603 A | 9/2007 |
| JP | 2008172597 A | 7/2008 |
| KR | 20040053467 A | 6/2004 |
| KR | 20110087949 A | 8/2011 |
| WO | 9603823 A1 | 2/1996 |
| WO | 9748197 A2 | 12/1997 |
| WO | 9935788 A2 | 7/1999 |
| WO | 0042721 A1 | 7/2000 |
| WO | 0178434 A1 | 10/2001 |
| WO | 0184760 A1 | 11/2001 |
| WO | 0221183 A1 | 3/2002 |
| WO | 0230141 A1 | 4/2002 |
| WO | 02102102 A1 | 12/2002 |
| WO | 03024027 A1 | 3/2003 |
| WO | 03098175 A1 | 11/2003 |
| WO | 2004030154 A2 | 4/2004 |
| WO | 2004047472 A1 | 6/2004 |
| WO | 2004056019 A1 | 7/2004 |
| WO | 2004059934 A1 | 7/2004 |
| WO | 2004086795 A2 | 10/2004 |
| WO | 2004093471 A2 | 10/2004 |
| WO | 2005062505 A1 | 7/2005 |
| WO | 2005069203 A2 | 7/2005 |
| WO | 2005069203 A3 | 7/2005 |
| WO | 2005073897 A1 | 8/2005 |
| WO | 2005079386 A2 | 9/2005 |
| WO | 2005101701 A2 | 10/2005 |
| WO | 2005111959 A2 | 11/2005 |
| WO | 2005117337 A1 | 12/2005 |
| WO | 2006011778 A1 | 2/2006 |
| WO | 2006018592 A1 | 2/2006 |
| WO | 2006019392 A1 | 2/2006 |
| WO | 2006039941 A1 | 4/2006 |
| WO | 2006046088 A1 | 5/2006 |
| WO | 2006051262 A1 | 5/2006 |
| WO | 2006077569 A1 | 7/2006 |
| WO | 2006094441 A1 | 9/2006 |
| WO | 2006133609 A1 | 12/2006 |
| WO | 2006136811 A1 | 12/2006 |
| WO | 2007048427 A1 | 5/2007 |
| WO | 2007075579 A2 | 7/2007 |
| WO | 2007077451 A1 | 7/2007 |
| WO | 2007088561 A1 | 8/2007 |
| WO | 2007091026 A1 | 8/2007 |
| WO | 2008008249 A2 | 1/2008 |
| WO | 2008027213 A2 | 3/2008 |
| WO | 2008033298 A2 | 3/2008 |
| WO | 2008039830 A2 | 4/2008 |
| WO | 2009014710 A1 | 1/2009 |
| WO | 2009100395 A1 | 8/2009 |
| WO | 2009100396 A1 | 8/2009 |
| WO | 2009100397 A2 | 8/2009 |
| WO | 2009100398 A2 | 8/2009 |
| WO | 2009145789 A1 | 12/2009 |
| WO | 2010087919 A2 | 8/2010 |
| WO | 2010090999 A1 | 8/2010 |
| WO | 2011043172 A1 | 4/2011 |
| WO | 2011112373 A1 | 9/2011 |
| WO | 2011139937 A1 | 11/2011 |
| WO | 2011139939 A1 | 11/2011 |
| WO | 2011139942 A1 | 11/2011 |
| WO | 2011160117 A1 | 12/2011 |
| WO | 2012024345 A2 | 2/2012 |
| WO | 2012051227 A1 | 4/2012 |
| WO | 2012051230 A1 | 4/2012 |
| WO | 2012054553 A1 | 4/2012 |
| WO | 2012100468 A1 | 8/2012 |
| WO | 2012170865 A2 | 12/2012 |
| WO | 2013009835 A1 | 1/2013 |
| WO | 2013063025 A1 | 5/2013 |
| WO | 2013122915 A1 | 8/2013 |
| WO | 2014022211 A2 | 2/2014 |
| WO | 2014070236 A1 | 5/2014 |
| WO | 2014082070 A1 | 5/2014 |
| WO | 2014082072 A1 | 5/2014 |
| WO | 2014082075 A1 | 5/2014 |
| WO | 2014144314 A1 | 9/2014 |
| WO | 2015054162 A1 | 4/2015 |
| WO | 2015054164 A1 | 4/2015 |
| WO | 2015054165 A1 | 4/2015 |

OTHER PUBLICATIONS

Author Unknown, "Andrew Unveils the InCell Fiber Optic Antenna System for In-Building Wireless Communications," Fiber Optics Weekly Update, Dec. 1, 2000, Information Gatekeepers Inc., pp. 3-4.

Arredondo, Albedo et al., "Techniques for Improving In-Building Radio Coverage Using Fiber-Fed Distributed Antenna Networks," IEEE 46th Vehicular Technology Conference, Atlanta, Georgia, Apr. 28-May 1, 1996, pp. 1540-1543, vol. 3.

Fitzmaurice, M. et al., "Distributed Antenna System for Mass Transit Communications," Vehicular Technology Conference, Boston, Massachusetts, Sep. 2000, IEEE, pp. 2011-2018.

Ghafouri-Shiraz, et al., "Radio on Fibre Communication Systems Based on Integrated Circuit-Antenna Modules," Microwave and Millimeter Wave Technology Proceedings, Beijing, China, Aug. 1998, IEEE, pp. 159-169.

Griffin, R.A. et al., "Radio-Over-Fiber Distribution Using an Optical Millimeter-Wave/DWDM Overlay," Optical Fiber Communication Conference, San Diego, California, Feb. 1999, IEEE, pp. 70-72.

Juntunen, J. et al., "Antenna Diversity Array Design for Mobile Communication Systems," Proceedings of the 2000 IEEE International Conference on Phased Array Systems and Technology, Dana Point, California, May 2000, IEEE, pp. 65-67.

Lee, D. et al., "Ricocheting Bluetooth," 2nd International Conference on Microwave and Millimeter Wave Technology Proceedings, Beijing, China, Sep. 2000, IEEE, pp. 432-435.

(56) References Cited

OTHER PUBLICATIONS

Lee, T., "A Digital Multiplexed Fiber Optic Transmission System for Analog Audio Signals," IEEE Western Canada Conference on Computer, Power, and Communications Systems in a Rural Environment, Regina, Saskatchewan, May 1991, pp. 146-149.
Schuh et al., "Hybrid Fibre Radio Access: A Network Operators Approach and Requirements," Proceedings of the 10th Microcoll Conference, Mar. 21-24, 1999, Budapest, Hungary, pp. 211-214.
Schweber, Bill, "Maintaining cellular connectivity indoors demands sophisticated design," EDN Network, Dec. 21, 2000, 2 pages, http://www.edn.com/design/integrated-circuit-design/4362776/ Maintaining-cellular-connectivity-indoors-demands-sophisticated-design.
Margotte, B. et al., "Fibre Optic Distributed Antenna System for Cellular and PCN/PCS Indoor Coverage," Microwave Engineering Europe, Jun. 1998, 6 pages.
Matsunaka et al., "Point-to-multipoint Digital Local Distribution Radio System in the 21 GHz Band," KDD Technical Journal, Mar. 1991, No. 145, p. 43-54.
Translation of the First Office Action for Chinese patent application 201180039569.3 dated Jan. 16, 2015, 7 pages.
International Search Report for PCT/US2012/025337 dated May 16, 2012, 4 pages.
Non-final Office Action for U.S. Appl. No. 13/025,719 dated Mar. 31, 2015, 26 pages.
Non-final Office Action for U.S. Appl. No. 13/967,426 dated Dec. 26, 2014, 15 pages.
Examination Report for European patent application 11721160.7 dated Oct. 21, 2015, 7 pages.
Advisory Action for U.S. Appl. No. 14/711,306 dated Oct. 8, 2015, 3 pages.
Final Office Action for U.S. Appl. No. 14/711,306 dated Jul. 9, 2015, 16 pages.
Advisory Action for U.S. Appl. No. 13/967,426 dated Jul. 6, 2015, 3 pages.
Notification of Grant for Chinese patent application 201190000473.1 dated Aug. 28, 2013, 4 pages.
International Search Report for PCT/US2011/034725 dated Aug. 5, 2011, 4 pages.
Non-final Office Action for U.S. Appl. No. 12/892,424 dated Nov. 5, 2012, 22 pages.
International Search Report and Written Opinion for PCT/US2011/034738 dated Jul. 27, 2011, 13 pages.
International Search Report for PCT/US2011/047821 dated Oct. 25, 2011, 4 pages.
International Preliminary Report on Patentability for PCT/US2011/047821 dated Feb. 19, 2013, 10 pages.
Non-final Office Action for U.S. Appl. No. 13/025,719 dated Sep. 11, 2013, 18 pages.
Parker et al., "Radio-over-fibre technologies arising from the Building the future Optical Network in Europe (BONE) project," IET Optoelectron., 2010, vol. 4, Issue 6, pp. 247-259.
Singh et al., "Distributed coordination with deaf neighbors: efficient medium access for 60 GHz mesh networks," IEEE INFOCOM 2010 proceedings, 9 pages.
Examination Report for European patent application 11754570.7 dated Nov. 18, 2013, 7 pages.
Final Office Action for U.S. Appl. No. 13/025,719 dated Dec. 31, 2013, 20 pages.
Advisory Action for U.S. Appl. No. 13/025,719 dated Mar. 14, 2014, 6 pages.
Non-final Office Action for U.S. Appl. No. 13/785,603 dated Dec. 23, 2013, 15 pages.
Final Office Action for U.S. Appl. No. 13/785,603 dated Apr. 14, 2014, 17 pages.
Advisory Action for U.S. Appl. No. 13/785,603 dated Jun. 30, 2014, 3 pages.
Non-final Office Action for U.S. Appl. No. 13/785,603 dated Sep. 9, 2014, 10 pages.
Final Office Action for U.S. Appl. No. 13/785,603 dated Dec. 4, 2014, 8 pages.
Non-final Office Action for U.S. Appl. No. 13/762,432 dated Aug. 20, 2014, 4 pages.
Notice of Allowance for U.S. Appl. No. 13/762,432 dated Dec. 24, 2014, 7 pages.
Chowdhury et al., "Multi-service Multi-carrier Broadband MIMO Distributed Antenna Systems for In-building Optical Wireless Access," Presented at the 2010 Conference on Optical Fiber Communication and National Fiber Optic Engineers Conference, Mar. 21-25, 2010, San Diego, California, IEEE, pp. 1-3.
International Search Report for PCT/US2011/055861 dated Feb. 7, 2012, 4 pages.
International Preliminary Report on Patentability for PCT/US2011/055861 dated Apr. 25, 2013, 9 pages.
International Search Report for PCT/US2011/055858 dated Feb. 7, 2012, 4 pages.
International Preliminary Report on Patentability for PCT/US2011/055858 dated Apr. 25, 2013, 8 pages.
International Search Report for PCT/US2011/034733 dated Aug. 1, 2011, 5 pages.
International Preliminary Report on Patentability for PCT/US2011/034733 dated Nov. 15, 2012, 8 pages.
First Office Action for Chinese patent application 201180024499.4 dated Dec. 1, 2014, 13 pages.
Examination Report for European patent application 11754570.7 dated Jan. 13, 2015, 5 pages.
Final Office Action for U.S. Appl. No. 13/967,426 dated Apr. 29, 2015, 22 pages.
Translation of the Second Office Action for Chinese patent application 201180024499.4 dated Aug. 17, 2015, 3 pages.
Non-final Office Action for U.S. Appl. No. 13/967,426 dated Sep. 17, 2015, 27 pages.
Cooper, A.J., "Fibre/Radio for the Provision of Cordless/Mobile Telephony Services in the Access Network," Electronics Letters, 1990, pp. 2054-2056, vol. 26, No. 24.
Bakaul, M., et al., "Efficient Multiplexing Scheme for Wavelength-Interleaved DWDM Millimeter-Wave Fiber-Radio Systems," IEEE Photonics Technology Letters, Dec. 2005, vol. 17, No. 12.
Huang, C., et al., "A WLAN-Used Helical Antenna Fully Integrated with the PCMCIA Carrier," IEEE Transactions on Antennas and Propagation, Dec. 2005, vol. 53, No. 12, pp. 4164-4168.
Gibson, B.C., et al., "Evanescent Field Analysis of Air-Silica Microstructure Waveguides," The 14th Annual Meeting the IEEE Lasers and Electro-Optics Society, 1-7803-7104-4/01, Nov. 12-13, 2001, vol. 2, pp. 709-710.
International Search Report for PCT/US07/21041 dated Mar. 7, 2008, 3 pages.
No Author, "ITU-T G.652, Telecommunication Standardization Sector of ITU, Series G: Transmission Systems and Media, Digital Systems and Networks, Transmission Media Characteristics—Optical Fibre Cables, Characteristics of a Single-Mode Optical Fiber and Cable," ITU-T Recommendation G.652, International Telecommunication Union, Jun. 2005, 20 pages.
Kojucharow, K., et al., "Millimeter-Wave Signal Properties Resulting from Electrooptical Upconversion," IEEE Transactions on Microwave Theory and Techniques, Oct. 2001, vol. 49, No. 10, pp. 1977-1985.
Monro, T.M., et al., "Holey Fibers with Random Cladding Distributions," Optics Letters, Feb. 15, 2000, vol. 25, No. 4, pp. 206-208.
Moreira, J.D., et al., "Diversity Techniques for OFDM Based WLAN Systems," The 13th IEEE International Symposium on Personal, Indoor and Mobile Radio Communications, Sep. 15-18, 2002, vol. 3, pp. 1008-1011.
Niiho, T., et al., "Multi-Channel Wireless LAN Distributed Antenna System Based on Radio-Over-Fiber Techniques," The 17th Annual Meeting of the IEEE Lasers and Electro-Optics Society, Nov. 2004, vol. 1, pp. 57-58.
Paulraj, A.J., et al., "An Overview of MIMO Communications—A Key to Gigabit Wireless," Proceedings of the IEEE, Feb. 2004, vol. 92, No. 2, 34 pages.

(56) References Cited

OTHER PUBLICATIONS

Pickrell, G.R., et al., "Novel Techniques for the Fabrication of Holey Optical Fibers," Proceedings of SPIE, Oct. 28-Nov. 2, 2001, vol. 4578, 2002, pp. 271-282.
Author Unknown, RFID Technology Overview, Date Unknown, 11 pages.
Roh, W., et al., "MIMO Channel Capacity for the Distributed Antenna Systems," Proceedings of the 56th IEEE Vehicular Technology Conference, Sep. 2002, vol. 2, pp. 706-709.
Seto, I., et al., "Antenna-Selective Transmit Diversity Technique for OFDM-Based WLANs with Dual-Band Printed Antennas," 2005 IEEE Wireless Communications and Networking Conference, Mar. 13-17, 2005, vol. 1, pp. 51-56.
Shen, C., et al., "Comparison of Channel Capacity for MIMO-DAS versus MIMO-CAS," The 9th Asia-Pacific Conference on Communications, Sep. 21-24, 2003, vol. 1, pp. 113-118.
Wake, D. et al., "Passive Picocell: A New Concept in Wireless Network Infrastructure," Electronics Letters, Feb. 27, 1997, vol. 33, No. 5, pp. 404-406.
Winters, J., et al., "The Impact of Antenna Diversity on the Capacity of Wireless Communication Systems," IEEE Transactions on Communications, vol. 42, No. 2/3/4, Feb./Mar./Apr. 1994, pp. 1740-1751.
Opatic, D., "Radio over Fiber Technology for Wireless Access," Ericsson, Oct. 17, 2009, 6 pages.
Final Office Action for U.S. Appl. No. 15/049,913, dated Nov. 25, 2016, 16 pages.
Advisory Action for U.S. Appl. No. 15/049,913, dated Feb. 15, 2017, 3 pages.
Non-Final Office Action for U.S. Appl. No. 15/381,952, dated Jan. 27, 2017, 14 pages.
Mohammed, Maalim, et al., "New Compact Design of Dual Notched Bands UWB Antenna with Slots in Radiating and Feeding Elements," IEEE Student Conference on Research and Development, Dec. 16-17, 2013, Putrajaya, Malaysia, IEEE, pp. 374-379.
International Search Report and Written Opinion for PCT/IL2015/051205 dated Mar. 10, 2016, 14 pages.
International Search Report for PCT/IL2015/051219 dated Mar. 17, 2016, 5 pages.
International Search Report and Written Opinion for PCT/IL2015/051217 dated Mar. 17, 2016, 14 pages.
International Search Report and Written Opinion for PCT/IL2015/051095 dated Mar. 2, 2016, 14 pages.
International Search Report and Written Opinion for PCT/IL2015/051061 dated Feb. 15, 2016, 12 pages.
Notice of Allowance for U.S. Appl. No. 13/025,719 dated Aug. 11, 2016, 8 pages.
Non-final Office Action for U.S. Appl. No. 15/049,913 dated Jun. 16, 2016, 20 pages.
No Author, "ITU-T G.657, Telecommunication Standardization Sector of ITU, Series G: Transmission Systems and Media, Digital Systems and Networks, Transmission Media and Optical Systems Characteristics—Optical Fibre Cables, Characteristics of a Bending Loss Insensitive Single Mode Optical Fibre and Cable for the Access Network," ITU-T Recommendation G.657, International Telecommunication Union, Dec. 2006, 20 pages.
Author Unknown, "Fiber Optic Distributed Antenna System," Installation and Users Guide, ERAU Version 1.5, May 2002, Andrews Corporation, 53 pages.
Notice of Allowance for U.S. Appl. No. 15/381,952, dated May 9, 2017, 7 pages.
Invitation to Pay Fees for International Patent Application No. PCT/IL2015/050970, dated Feb. 17, 2016, 6 pages.
International Search Report for PCT/IL2015/050970, dated May 9, 2016, 6 pages.
International Preliminary Report on Patentability for PCT/IL2015/050970, dated Apr. 6, 2017, 17 pages.
Non-Final Office Action for U.S. Appl. No. 14/496,507, dated Feb. 24, 2017, 15 pages.
Non-Final Office Action for U.S. Appl. No. 15/332,505, dated Apr. 5, 2017, 24 pages.
Notice of Allowance and Examiner-Initiated Interview Summary for U.S. Appl. No. 15/098,941, dated Jul. 14, 2016, 18 pages.
Corrected Notice of Allowability for U.S. Appl. No. 15/098,941, dated Jul. 27, 2016, 5 pages.
Translation of the First Office Action for Chinese Patent Application No. 201610029179.2, dated Jul. 27, 2017, 19 pages.
Examiner's Answer to the Appeal Brief for U.S. Appl. No. 15/049,913, mailed Jun. 22, 2017, 22 pages.
Notice of Allowance for U.S. Appl. No. 15/332,505, dated Aug. 31, 2017, 8 pages.
Notice of Allowance for U.S. Appl. No. 15/381,952, dated Jul. 31, 2017, 7 pages.
Final Office Action for U.S. Appl. No. 14/496,507, dated Sep. 28, 2017, 21 pages.
Non-Final Office Action for U.S. Appl. No. 15/473,827, dated Sep. 22, 2017, 38 pages.
Examination Report for European Patent Application No. 11721160.7, dated Sep. 25, 2017, 7 pages.
Translation of the Second Office Action for Chinese Patent Application No. 201610029179.2, dated Feb. 1, 2018, 3 pages.
Final Office Action for U.S. Appl. No. 15/473,827, dated Jan. 26, 2018, 40 pages.

* cited by examiner

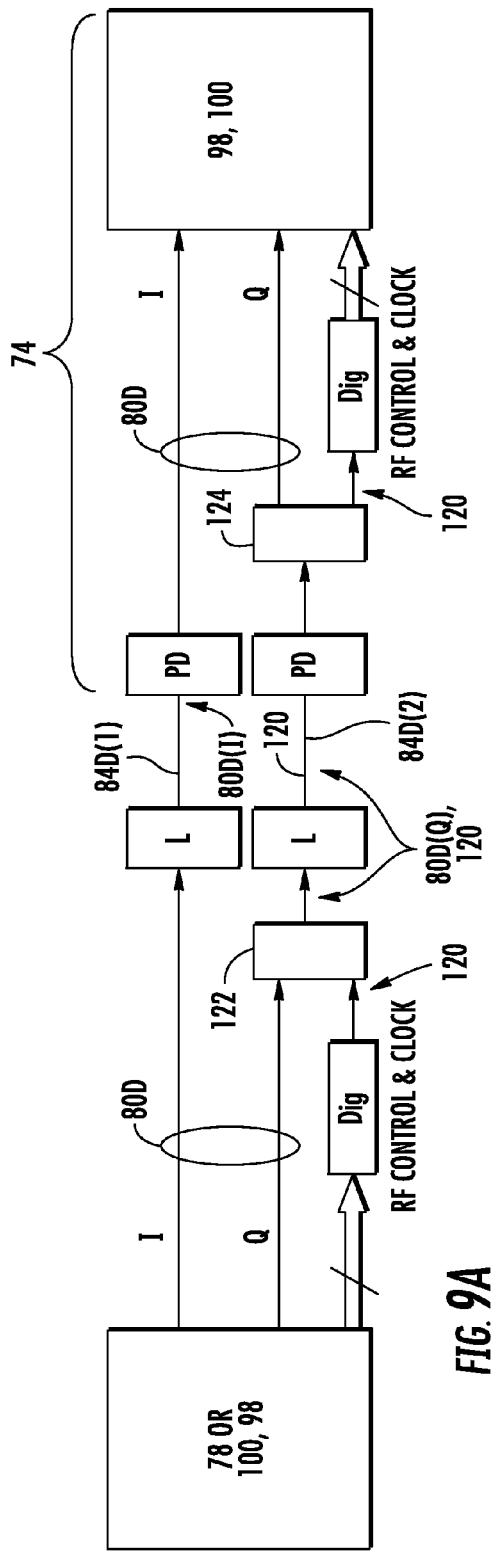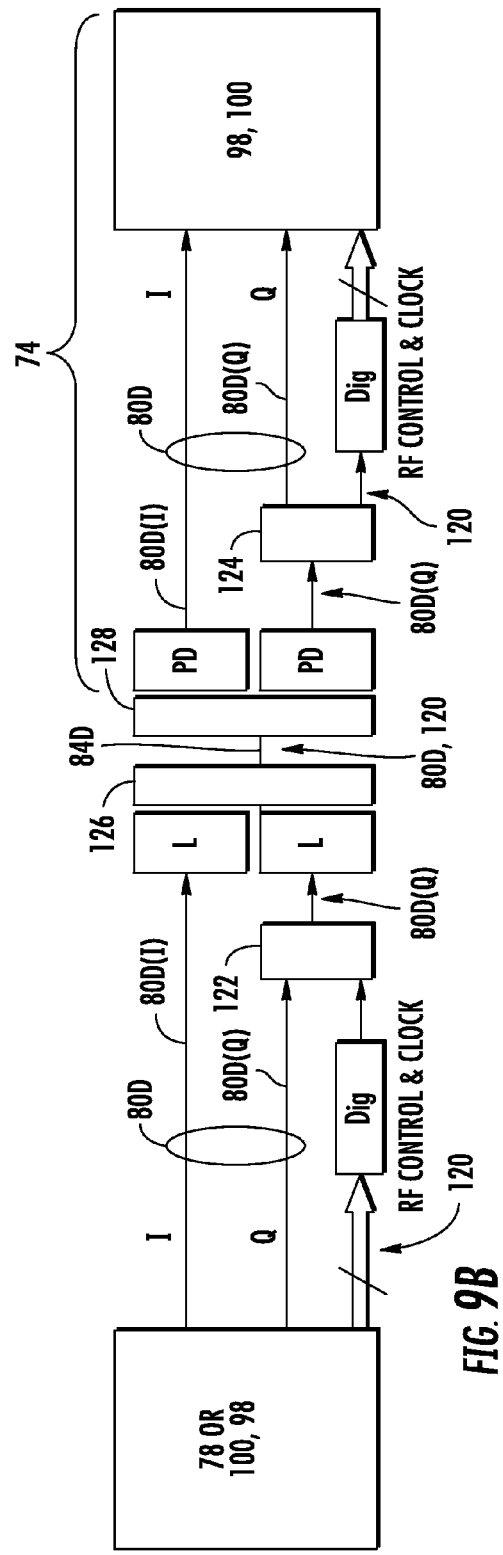

REMOTE ANTENNA CLUSTERS AND RELATED SYSTEMS, COMPONENTS, AND METHODS SUPPORTING DIGITAL DATA SIGNAL PROPAGATION BETWEEN REMOTE ANTENNA UNITS

PRIORITY CLAIM

This application is a continuation application of U.S. patent application Ser. No. 13/762,432 filed Feb. 8, 2013, now issued as U.S. Pat. No. 9,037,143, which is a continuation application of International Application No. PCT/US2011/047821, filed Aug. 16, 2011, which claims the benefit of priority to U.S. Provisional Patent Application Ser. No. 61/374,026, filed on Aug. 16, 2010, all applications being incorporated herein by reference in their entireties.

RELATED APPLICATIONS

The present application is related to U.S. patent application Ser. No. 12/892,424 filed on Sep. 28, 2010 entitled "Providing Digital Data Services in Optical Fiber-based Distributed Radio Frequency (RF) Communications Systems, And Related Components and Methods," which claims priority to U.S. Provisional Patent Application No. 61/330,386 filed on May 2, 2010 entitled "Providing Digital Data Services in Optical Fiber-based Distributed Radio Frequency (RF) Communications Systems, And Related Components and Methods," both of which are incorporated herein by reference in their entireties.

BACKGROUND

Field of the Disclosure

The technology of the disclosure relates to optical fiber-based distributed communications/antenna systems for distributing communications signals over optical fiber.

Technical Background

Wireless communication is rapidly growing, with ever-increasing demands for high-speed mobile data communication. As an example, so-called "wireless fidelity" or "WiFi" systems and wireless local area networks (WLANs) are being deployed in many different types of areas (e.g., coffee shops, airports, libraries, etc.). Distributed communications or antenna systems communicate with wireless devices called "clients," which must reside within the wireless range or "cell coverage area" in order to communicate with an access point device.

One approach to deploying a distributed antenna system involves the use of radio frequency (RF) antenna coverage areas, also referred to as "antenna coverage areas." Antenna coverage areas can have a radius in the range from a few meters up to twenty meters as an example. Combining a number of access point devices creates an array of antenna coverage areas. Because the antenna coverage areas each cover small areas, there are typically only a few users (clients) per antenna coverage area. This allows for minimizing the amount of RF bandwidth shared among the wireless system users. It may be desirable to provide antenna coverage areas in a building or other facility to provide distributed antenna system access to clients within the building or facility.

SUMMARY OF THE DETAILED DESCRIPTION

Embodiments disclosed in the detailed description include remote antenna clusters and related distributed antenna systems, components, and methods that support digital data signal propagation between remote antenna units. The distributed antenna systems can facilitate distributing digital data signals to distributed remote antenna units to provide digital data services. Wireless client devices in the communication range of a remote antenna unit can wirelessly communicate with the remote antenna unit to receive digital data services. As a non-limiting example, the remote antenna units may be wireless access points that allow wireless client devices to connect to a wired network using a network protocol. The digital data signals may be communicated at higher frequencies. Providing digital data services at higher frequencies can support larger channel bandwidths and in turn higher data rate transfers. Many digital data client devices can benefit from higher data transfer rates.

The remote antenna clusters and distributed antenna systems disclosed herein may be deployed in buildings or other indoor environments as non-limiting examples. However, higher frequency wireless signals are more easily attenuated or blocked from traveling through walls or other building structures where distributed antenna systems are installed. In this regard, the distributed antenna systems disclosed herein may include RAUs configured to propagate the digital data signals between each other. The RAUs may be grouped in remote antenna clusters and be located sufficiently close to each other to avoid or reduce attenuation issues when the high-frequency digital data signals are propagated between remote antenna units. The digital data signals may be propagated between RAUs for digital data signals transmitted to wireless client devices in the remote antenna clusters and for digital data signals received from wireless client devices in the remote antenna clusters. Received digital data signals from wireless client devices can be propagated from RAU to RAU until the digital data signals reach a wired network device for communication over a network.

In this regard in one embodiment, a remote antenna cluster supporting digital data signal propagation among remote antenna units is provided. The remote antenna cluster comprises a first remote antenna unit (RAU). The first RAU is configured to receive downlink digital data signals from a remotely located digital data services (DDS) controller over at least one downlink communications link and communicate the received downlink digital data signals to client devices. The first RAU is also configured to receive uplink digital data signals from the client devices and communicate the received uplink digital data signals over at least one uplink communications link to the DDS switch. The first RAU is also configured to propagate received downlink digital data signals to at least one second RAU. The first RAU is also configured to receive uplink digital data signals from the at least one second RAU for communication over the at least one uplink communications link. The at least one second RAU is configured to receive the downlink digital data signals and communicate the received downlink digital data signals to client devices. The at least one second RAU is also configured to receive uplink digital data signals from the client devices. The at least one second RAU is also configured to propagate the received uplink digital data signals for receipt by the first RAU.

In another embodiment, a method of propagating digital data signals between remote antenna units in a remote antenna cluster is provided. The method includes receiving at a first remote antenna unit (RAU) downlink digital data signals over at least one downlink communications link from a remotely located digital data services (DDS) controller and communicating the received downlink digital data signals to client devices. The method also includes receiving in the first RAU, uplink digital data signals from the client devices and communicating the received uplink digital data signals over the at least one uplink communications link to the DDS switch. The method also includes propagating the received downlink digital data signals from the first RAU to at least one second RAU. The method also includes receiving uplink digital data signals from the at least one second RAU for communication over the at least one uplink communications link. The method also includes receiving in the at least one second RAU the downlink digital data signals and communicating the received downlink digital data signals to client devices. The method also includes receiving in the at least one second RAU uplink digital data signals from the client devices. The method also includes propagating the received downlink digital data signals and the received uplink digital data signals for receipt by the first RAU.

In another embodiment, a distributed antenna system supporting digital data signal propagation among remote antenna units is disclosed. The distributed antenna system comprises a digital data services (DDS) controller communicatively coupled to a digital data network. The DDS switch is configured to receive downlink digital data signals from the digital data network and distribute the received downlink digital data signals over at least one downlink communications link. The DDS switch is also configured to receive uplink digital data signals over at least one uplink communications link and provide the received digital data signals to the digital data network. The distributed antenna system also includes a remote antenna cluster. The remote antenna cluster includes a first remote antenna unit (RAU). The first RAU is configured to receive the downlink digital data signals over the at least one downlink communications link and communicate the received downlink digital data signals to client devices. The first RAU is also configured to receive uplink digital data signals from the client devices and communicate the received uplink digital data signals over the at least one uplink communications link. The first RAU is also configured to propagate received downlink digital data signals to at least one second RAU also included in the remote antenna cluster. The first RAU is also configured to receive uplink digital data signals from the at least one second RAU for communication over the at least one uplink communications link. The distributed antenna system also includes the at least one second RAU. The at least one second RAU is configured to receive the downlink digital data signals and communicate the received downlink digital data signals to client devices. The at least one second RAU is also configured to receive uplink digital data signals from the client devices. The at least one second RAU is also configured to propagate the received downlink digital data signals and the received uplink digital data signals for receipt by the first RAU.

Examples of digital data services include, but are not limited to Ethernet, WLAN, Worldwide Interoperability for Microwave Access (WiMax), Wireless Fidelity (WiFi), Digital Subscriber Line (DSL), and Long Term Evolution (LTE), etc. Further, as a non-limiting example, the distributed antenna system may be an optical fiber-based distributed antenna system, but such is not required. The embodiments disclosed herein are also applicable to other remote antenna clusters and distributed antenna systems, including those that include other forms of communications media for distribution of communications signals, including electrical conductors and wireless transmission. The embodiments disclosed herein may also be applicable to remote antenna clusters and distributed antenna systems and may also include more than one communications media for distribution of communications signals (e.g., digital data services, RF communications services).

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE FIGURES

FIG. 9A is a schematic diagram of an exemplary distribution of downlink I digital data signals and downlink Q digital data signals multiplexed with control signals from a DDS switch to a central RAU in a remote antenna cluster over separate optical fibers;

FIG. 9B is a schematic diagram of another exemplary distribution of downlink I digital data signals and downlink Q digital data signals multiplexed with control signals from a DDS switch to a central RAU in a remote antenna cluster over separate optical fibers;

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed in the detailed description include remote antenna clusters and related distributed antenna systems, components, and methods that support digital data signal propagation between remote antenna units (RAUs). The distributed antenna systems can facilitate distributing digital data signals to distributed RAUs to provide digital data services. Wireless client devices in the communication range of a RAU can wirelessly communicate with the RAU to receive digital data services. As a non-limiting example, the RAUs may be wireless access points that allow wireless client devices to connect to a wired network using a network protocol. The digital data signals may be communicated at higher frequencies. Providing digital data services at higher frequencies can support larger channel bandwidths and in turn higher data rate transfers. Many digital data client devices can benefit from higher data transfer rates.

The remote antenna clusters and distributed antenna systems disclosed herein may be deployed in buildings or other indoor environments as non-limiting examples. However, higher frequency wireless signals are more easily attenuated or blocked from traveling through walls or other building structures where distributed antenna systems are installed. In this regard, the distributed antenna systems disclosed herein may include RAUs configured to propagate the digital data signals between each other. The RAUs may be grouped in remote antenna clusters and be located sufficiently close to each other to avoid or reduce attenuation issues when the high-frequency digital data signals are propagated between RAUs. The digital data signals may be propagated between RAUs for digital data signals transmitted to wireless client devices in the remote antenna clusters and for digital data signals received from wireless client devices in the remote antenna clusters. Digital data signals received from wireless client devices can be propagated from RAU to RAU until the digital data signals reach a wired network device for communication over a network.

Figure 1:
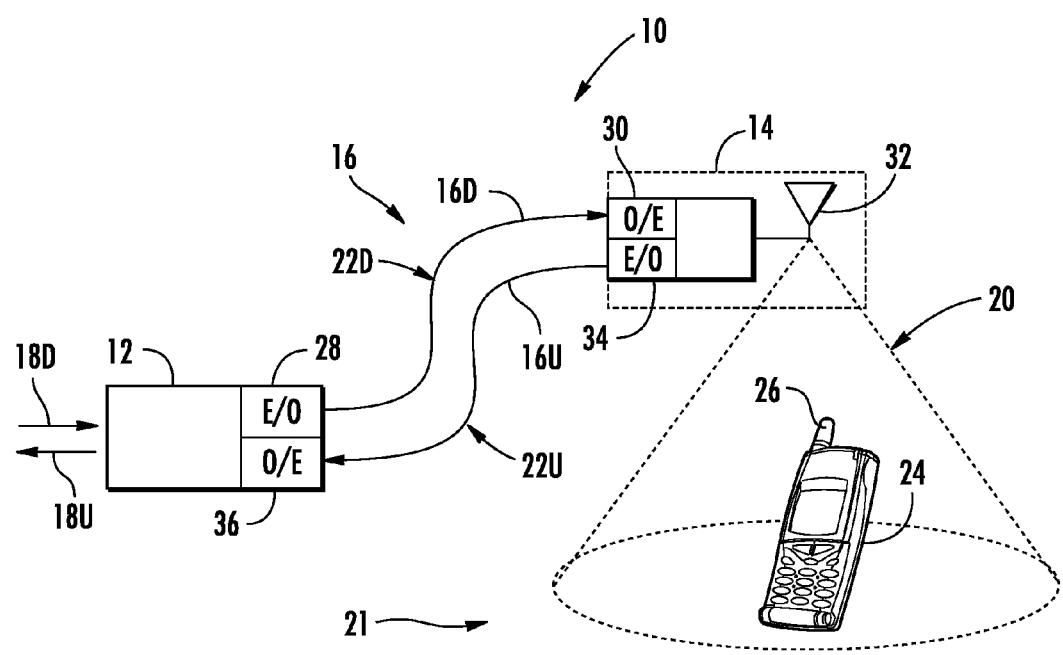
FIG. 1 is a schematic diagram of an exemplary distributed antenna system that is configured to remotely distribute communications signals, wherein the communications signals can include digital data signals and radio-frequency (RF) communications signals.
Figure 2:
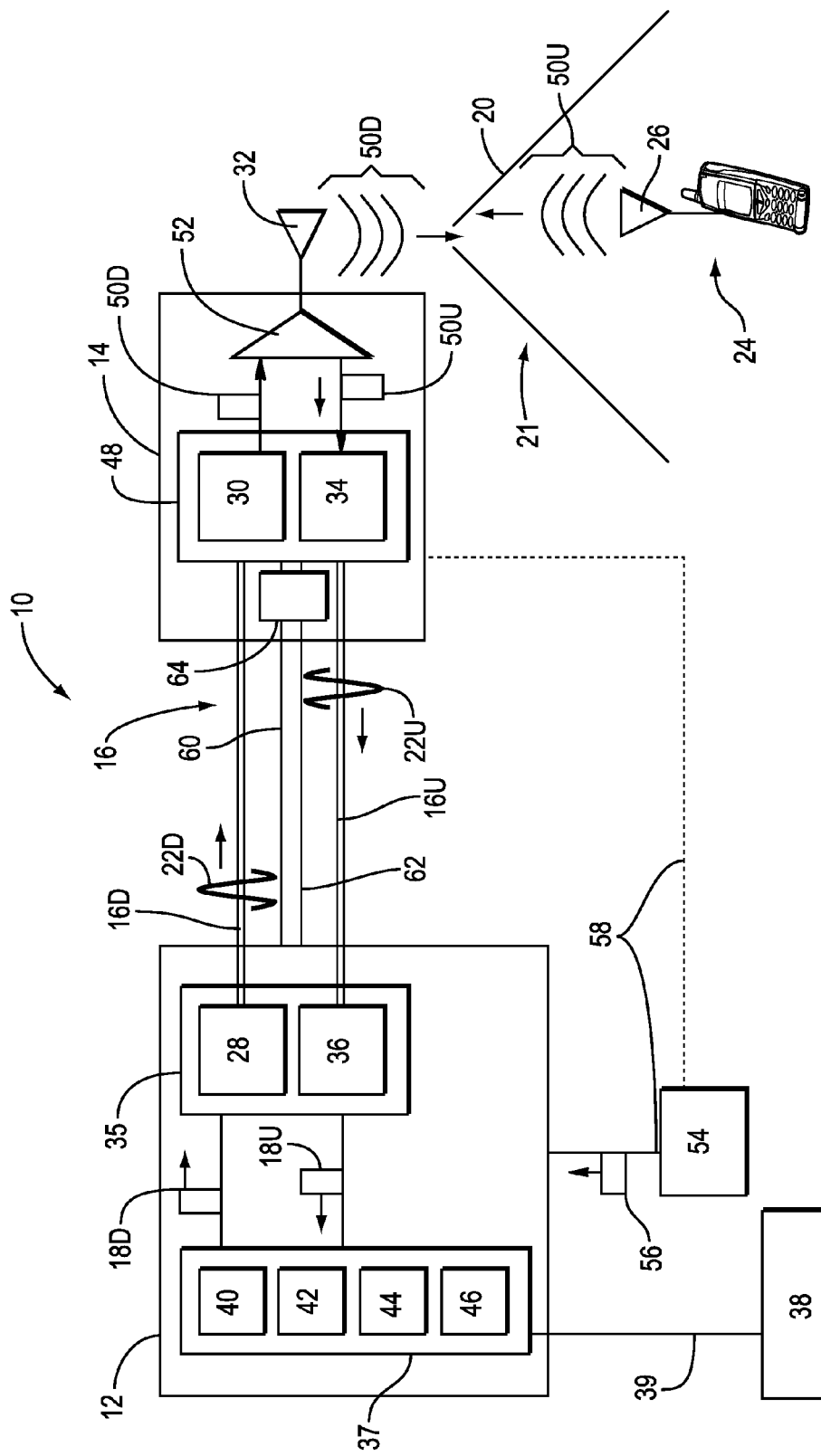
FIG. 2 is a more detailed schematic diagram of exemplary digital data services (DDS) controller and a remote antenna unit (RAU) that can be deployed in the distributed antenna system of FIG. 1 to provide digital data services.

Before discussing examples of remote antenna clusters and distributed antenna systems that support digital data signal propagation between RAUs, exemplary distributed antenna systems capable of distributing frequency modulated communications signals to distributed antenna units or RAUs are first described with regard to FIGS. 1 and 2. Examples that support digital data signal propagation between RAUs are illustrated starting at FIG. 3 and are discussed below. The distributed antenna systems in FIGS. 1 and 2 discussed below include distribution of radio frequency (RF) communications signals; however, the distributed antenna systems are not limited to distribution of RF communications signals. Also note that while the distributed antenna systems in FIGS. 1 and 2 discussed below include distribution of communications signals over optical fiber, these distributed antenna systems are not limited to distribution over optical fiber. Distribution mediums could also include, but are not limited to, coaxial cable, twisted-pair conductors, wireless transmission and reception, and any combination thereof. Also, any combination can be employed that also involves optical fiber for portions of the distributed antenna system.

In this regard, FIG. 1 is a schematic diagram of an embodiment of a distributed antenna system 10. In this embodiment, the distributed antenna system 10 is an optical fiber-based distributed antenna system. The distributed antenna system 10 is configured to create one or more antenna coverage areas for establishing communications with wireless client devices located in the RF range of the antenna coverage areas. The distributed antenna system 10 provides RF communication services (e.g., cellular services). In this embodiment, the distributed antenna system 10 includes head-end equipment (HEE) 12 such as a head-end unit (HEU), one or more RAUs (RAUs) 14, and an optical fiber 16 that optically couples the HEE 12 to the RAU 14. The RAU 14 is a type of remote communications unit. In general, a remote communications unit can support either wireless communications, wired communications, or both. The RAU 14 can support wireless communications and may also support wired communications. The HEE 12 is configured to receive communications over downlink electrical RF signals 18D from a source or sources, such as a network or carrier as examples, and provide such communications to the RAU 14. The HEE 12 is also configured to return communications received from the RAU 14, via uplink electrical RF signals 18U, back to the source or sources. In this regard in this embodiment, the optical fiber 16 includes at least one downlink optical fiber 16D to carry signals communicated from the HEE 12 to the RAU 14 and at least one uplink optical fiber 16U to carry signals communicated from the RAU 14 back to the HEE 12.

One downlink optical fiber 16D and one uplink optical fiber 16U could be provided to support multiple channels each using wave-division multiplexing (WDM), as discussed in U.S. patent application Ser. No. 12/892,424 entitled "Providing Digital Data Services in Optical Fiber-based Distributed Radio Frequency (RF) Communications Systems, And Related Components and Methods," incorporated herein by reference in its entirety. Other options for WDM and frequency-division multiplexing (FDM) are disclosed in U.S. patent application Ser. No. 12/892,424, any of which can be employed in any of the embodiments disclosed herein. Further, U.S. patent application Ser. No. 12/892,424 also discloses distributed digital data communications signals in a distributed antenna system which may also be distributed in the distributed antenna system 10 either in conjunction with RF communications signals or not.

The distributed antenna system 10 has an antenna coverage area 20 that can be disposed about the RAU 14. The antenna coverage area 20 of the RAU 14 forms an RF coverage area 21. The HEE 12 is adapted to perform or to facilitate any one of a number of Radio-over-Fiber (RoF) applications, such as RF identification (RFID), wireless local-area network (WLAN) communication, or cellular phone service. Shown within the antenna coverage area 20 is a client device 24 in the form of a mobile device as an example, which may be a cellular telephone as an example. The client device 24 can be any device that is capable of receiving RF communications signals. The client device 24 includes an antenna 26 (e.g., a wireless card) adapted to receive and/or send electromagnetic RF signals.

With continuing reference to FIG. 1, to communicate the electrical RF signals over the downlink optical fiber 16D to the RAU 14, to in turn be communicated to the client device 24 in the antenna coverage area 20 formed by the RAU 14, the HEE 12 includes a radio interface in the form of an electrical-to-optical (E/O) converter 28. The E/O converter 28 converts the downlink electrical RF signals 18D to downlink optical RF signals 22D to be communicated over the downlink optical fiber 16D. The RAU 14 includes an optical-to-electrical (O/E) converter 30 to convert received downlink optical RF signals 22D back to electrical RF signals to be communicated wirelessly through an antenna 32 of the RAU 14 to client devices 24 located in the antenna coverage area 20.

Similarly, the antenna 32 is also configured to receive wireless RF communications from client devices 24 in the antenna coverage area 20. In this regard, the antenna 32 receives wireless RF communications from client devices 24 and communicates electrical RF signals representing the wireless RF communications to an E/O converter 34 in the RAU 14. The E/O converter 34 converts the electrical RF signals into uplink optical RF signals 22U to be communicated over the uplink optical fiber 16U. An O/E converter 36 provided in the HEE 12 converts the uplink optical RF signals 22U into uplink electrical RF signals, which can then be communicated as uplink electrical RF signals 18U back to a network or other source. The HEE 12 in this embodiment is not able to distinguish the location of the client device 24 in this embodiment. The client device 24 could be in the range of any antenna coverage area 20 formed by an RAU 14.

FIG. 2 is a more detailed schematic diagram of the exemplary distributed antenna system 10 of FIG. 1 that provides electrical RF service signals for a particular RF service or application. In an exemplary embodiment, the HEE 12 includes a service unit 37 that provides electrical RF service signals by passing (or conditioning and then passing) such signals from one or more outside systems 38 via a network link 39. As a non-limiting example, the outside system 38 may be a base station or base transceiver station (BTS). The BTS 38 may be provided by a second party such as a cellular service provider, and can be co-located or located remotely from the HEE 12. A BTS is any station or signal source that provides an input signal to the HEE 12 and can receive a return signal from the HEE 12.

In a typical cellular system, for example, a plurality of BTSs are deployed at a plurality of remote locations to provide wireless telephone coverage. Each BTS serves a corresponding cell and when a mobile client device enters the cell, the BTS communicates with the mobile client device. Each BTS can include at least one radio transceiver for enabling communication with one or more subscriber units operating within the associated cell. As another example, wireless repeaters or bi-directional amplifiers could also be used to serve a corresponding cell in lieu of a BTS. Alternatively, radio input could be provided by a repeater, picocell, or femtocell as other examples.

In a particular example embodiment, cellular signal distribution in the frequency range from 400 MegaHertz (MHz) to 2.7 GigaHertz (GHz) are supported by the distributed antenna system 10. Any other electrical RF signal frequencies are possible. In another exemplary embodiment, the service unit 37 provides electrical RF service signals by generating the signals directly. In another exemplary embodiment, the service unit 37 coordinates the delivery of the electrical RF service signals between client devices 24 within the antenna coverage area 20.

With continuing reference to FIG. 2, the service unit 37 is electrically coupled to the E/O converter 28 that receives the downlink electrical RF signals 18D from the service unit 37 and converts them to corresponding downlink optical RF signals 22D. In an exemplary embodiment, the E/O converter 28 includes a laser suitable for delivering sufficient dynamic range for the RoF applications described herein, and optionally includes a laser driver/amplifier electrically coupled to the laser. Examples of suitable lasers for the E/O converter 28 include, but are not limited to, laser diodes, distributed feedback (DFB) lasers, Fabry-Perot (FP) lasers, and vertical cavity surface emitting lasers (VCSELs).

With continuing reference to FIG. 2, the HEE 12 also includes the O/E converter 36, which is electrically coupled to the service unit 37. The O/E converter 36 receives the uplink optical RF signals 22U and converts them to corresponding uplink electrical RF signals 18U. In an example embodiment, the O/E converter 36 is a photodetector, or a photodetector electrically coupled to a linear amplifier. The E/O converter 28 and the O/E converter 36 constitute a "converter pair" 35, as illustrated in FIG. 2.

In accordance with an exemplary embodiment, the service unit 37 in the HEE 12 can include an RF signal conditioner unit 40 for conditioning the downlink electrical RF signals 18D and the uplink electrical RF signals 18U, respectively. The service unit 37 can include a digital signal processing unit ("digital signal processor") 42 for providing to the RF signal conditioner unit 40 an electrical signal that is modulated onto an RF carrier to generate a desired downlink electrical RF signal 18D. The digital signal processor 42 is also configured to process a demodulation signal provided by the demodulation of the uplink electrical RF signal 18U by the RF signal conditioner unit 40. The HEE 12 can also include an optional central processing unit (CPU) 44 for processing data and otherwise performing logic and computing operations, and a memory unit 46 for storing data, such as data to be transmitted over a WLAN or other network for example.

With continuing reference to FIG. 2, the RAU 14 also includes a converter pair 48 comprising the OLE converter 30 and the E/O converter 34. The OLE converter 30 converts the received downlink optical RF signals 22D from the HEE 12 back into downlink electrical RF signals 50D. The E/O converter 34 converts uplink electrical RF signals 50U received from the client device 24 into the uplink optical RF signals 22U to be communicated to the HEE 12. The OLE converter 30 and the E/O converter 34 are electrically coupled to the antenna 32 via an RF signal-directing element 52, such as a circulator for example. The RF signal-directing element 52 serves to direct the downlink electrical RF signals 50D and the uplink electrical RF signals 50U, as discussed below. In accordance with an exemplary embodiment, the antenna 32 can include any type of antenna, including but not limited to one or more patch antennas, such as disclosed in U.S. patent application Ser. No. 11/504,999, filed Aug. 16, 2006 entitled "Radio-over-Fiber Transponder With A Dual-Band Patch Antenna System," and U.S. patent application Ser. No. 11/451,553, filed Jun. 12, 2006 entitled "Centralized Optical Fiber-Based Wireless Picocellular Systems and Methods," both of which are incorporated herein by reference in their entireties.

With continuing reference to FIG. 2, the distributed antenna system 10 also includes a power supply 54 that provides an electrical power signal 56. The power supply 54 is electrically coupled to the HEE 12 for powering the power-consuming elements therein. In an exemplary embodiment, an electrical power line 58 runs through the HEE 12 and over to the RAU 14 to power the OLE converter 30 and the E/O converter 34 in the converter pair 48, the optional RF signal-directing element 52 (unless the RF signal-directing element 52 is a passive device such as a circulator for example), and any other power-consuming elements provided. In an exemplary embodiment, the electrical power line 58 includes two wires 60 and 62 that carry a single voltage and are electrically coupled to a DC power converter 64 at the RAU 14. The DC power converter 64 is electrically coupled to the OLE converter 30 and the E/O converter 34 in the converter pair 48, and changes the voltage or levels of the electrical power signal 56 to the power level(s) required by the power-consuming components in the RAU 14. In an exemplary embodiment, the DC power converter 64 is either a DC/DC power converter or an AC/DC power converter, depending on the type of electrical power signal 56 carried by the electrical power line 58. In another example embodiment, the electrical power line 58 (dashed line) runs directly from the power supply 54 to the RAU 14 rather than from or through the HEE 12. In another example embodiment, the electrical power line 58 includes more than two wires and may carry multiple voltages.

It may be desirable to provide distributed antenna systems that provide digital data services for client devices. For example, it may be desirable to provide digital data services to client devices located within a distributed antenna system. Wired and wireless devices may be located in the building infrastructures that are configured to access digital data services. Examples of digital data services include, but are not limited to, Ethernet, WLAN, WiMax, WiFi, DSL, and LTE, etc. Ethernet standards could be supported, including but not limited to 100 Megabits per second (Mbs) (i.e., fast Ethernet) or Gigabit (Gb) Ethernet, or ten Gigabit (10 G) Ethernet. Example of digital data devices include, but are not limited to, wired and wireless servers, wireless access points (WAPs), gateways, desktop computers, hubs, switches, remote radio heads (RRHs), baseband units (BBUs), and femtocells. A separate digital data services network can be provided to provide digital data services to digital data devices.

It may also be desired to provide high-speed wireless digital data service connectivity with RAUs in a distributed antenna system. One example would be Wireless Fidelity (WiFi). WiFi was initially limited in data rate transfer to 12.24 Megabits per section (Mb/s) and is provided at data transfer rates of up to 54 Mb/s using WLAN frequencies of 2.4 GHz and 6 GHz. To increase data transfer rates, the frequency of wireless signals could be increased to provide larger channel bandwidth. For example, the 60 GHz spectrum is an unlicensed spectrum that could be employed. However, higher frequency wireless signals are more easily attenuated or blocked from traveling through walls or other building structures where distributed antenna systems are installed.

In this regard, the distributed antenna systems disclosed herein may include RAUs configured to propagate the digital data signals between each other. The RAUs may be grouped in remote antenna clusters and be located sufficiently close to each other to avoid or reduce attenuation issues when the high-frequency digital data signals are propagated between RAUs. The digital data signals may be propagated between RAUs for digital data signals transmitted to wireless client devices in the remote antenna clusters and for digital data signals received from wireless client devices in the remote antenna clusters. Received digital data signals from wireless client devices can be propagated from RAU to RAU until the digital data signals reach a wired network device for communication over a network.

Figure 3:
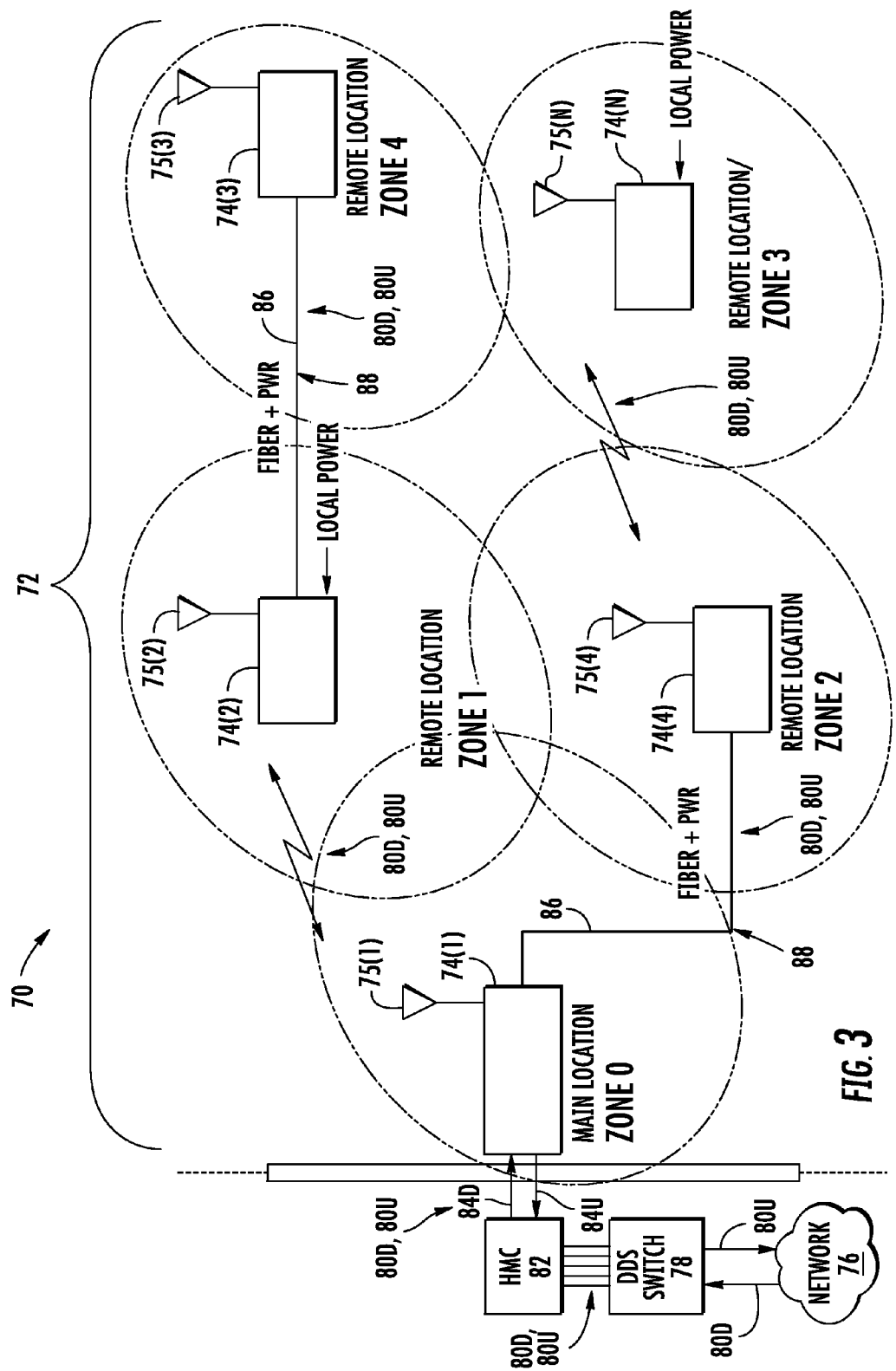
FIG. 3 is a schematic diagram of an exemplary distributed antenna system with an exemplary remote antenna cluster comprised of a plurality of RAUs configured to propagate digital data signals between each other and to a central RAU coupled to a network.

FIG. 3 is a schematic diagram of an exemplary distributed antenna system 70 with an exemplary remote antenna cluster 72 comprised of a plurality of RAUs 74(2)-74(N) configured to propagate digital data signals between each other and to a central RAU 74(1) coupled to a digital data network 76. Providing a central RAU 74(1) may avoid pulling communications links to more locations throughout a building or structure in which the distributed antenna system 70 is deployed. Each of the RAU 74(1)-74(N) contain antennas 75(1)-75(N) to be able to wirelessly communicate with other RAUs 74(1)-74(N) and client devices in the remote antenna cluster 72. The RAUs 74(1)-74(N) could be similar to the RAU 14 in FIGS. 1 and 2. The RAUs 74(1)-74(N) could be wireless access points (WAPs). As illustrated in FIG. 3, a digital data services (DDS) controller 78 may be interfaced with the digital data network 76 to control receipt and distribution of downlink and uplink digital data signals 80D, 80U between the digital data network 76 and the remote antenna cluster 72. A head-end media controller (HMC) 82 may be provided to convert the electrical digital data signals 80D, 80U to optical digital data signals if the digital data signals 80D, 80U are to be transported to the remote antenna cluster 72 via main downlink and uplink optical fiber communications links 84D, 84U, as is provided in FIG. 4.

The main downlink and uplink optical fiber communications links 84 act as a back haul to the HMC 82 and DDS switch 78. Providing downlink and uplink optical fiber communications links 84D, 84U as the communications medium between the HMC 82 and the remote antenna cluster 72 may be advantageous due to the high bandwidth and data transfer rates that can be supported by optical fiber. However, other communications link mediums other than optical fiber can be employed if desired. As will be discussed in more detail below, each of the RAUs 74(1)-74(N) can provide digital data signals to and from each other and between client devices where a sufficiently high data transfer rate is needed to support the communications of the remote antenna cluster 72.

The DDS switch 78 can include only a media converter for provisional media conversion functionality or can include additional functionality to facilitate digital data services. The DDS switch 78 is a controller configured to provide digital data services over a communications link, interface, or other communications channel or line, which may be either wired, wireless, or a combination of both. The HMC 82 can include a housing configured to house digital media converters (DMCs) to interface to the DDS switch 78 and provide digital data services. For example, the DDS switch 78 could include an Ethernet switch. The DDS switch 78 may be configured to provide Gigabit (Gb) Ethernet digital data service as an example. The HMC 82 is configured to convert electrical digital signals to optical digital signals, and vice versa.

With continuing reference to FIG. 3, each of the RAUs 74(1-N) are provided in different zones, labeled Zone 0 through Zone 4 in this example. Each Zone is selected to provide sufficient wireless coverage in the distributed antenna system 70 for client devices. Further, the Zones are selected to be of a size so that the frequency of the downlink and uplink digital data signals 80D, 80U supported by the RAUs 74(1-N) will travel far enough before being attenuated or otherwise blocked for the downlink and uplink digital data signals 80D, 80U to reach or be propagated to another RAU 74 eventually reaching the central RAU 74(1) and being distributed to the digital data network 76. For example, the wireless communications signals may be modulated about a center frequency of 60 GHz as a non-limiting example. The central RAU 74(1) is communicatively coupled to the HMC 82 via the main downlink and uplink optical fiber communications links 84D, 84U. The central RAU 74(1) is responsible for distributing any of the downlink digital data signals 80D to the other RAUs 74(2)-74(N) and receiving or collecting the uplink digital data signals 80U received by the RAUs 74(2)-74(N) either directly or received through propagation from another RAU 74(2)-74(N) to be provided to the digital data network 76. The central RAU 74(1) could be a gateway that is configured to communicate digital data signals between the network created by the remote antenna cluster 72 and the digital data network 76.

In this regard, the remote antenna cluster 72 supports digital data signal 80D, 80U propagation among RAUs 74(1)-74(N). A first or central RAU 74(1) is provided and configured to receive downlink digital data signals 80D from a remotely located digital data services (DDS) switch 78 over at least one downlink communications link in the form of the main downlink optical fiber communications link 84D in this embodiment. For example, the DDS switch 78 may be an Ethernet switch. The central RAU 74(1) is configured to communicate the received downlink digital data signals 80D to client devices in the distributed antenna system 70. The central RAU 74(1) is also configured to receive uplink digital data signals 80U directly from the client devices in the distributed antenna system 70 and communicate the received uplink digital data signals 80U over at least one uplink communications link provided in the form of the main uplink optical fiber 84U in this embodiment to the DDS switch 78.

Figure 4:
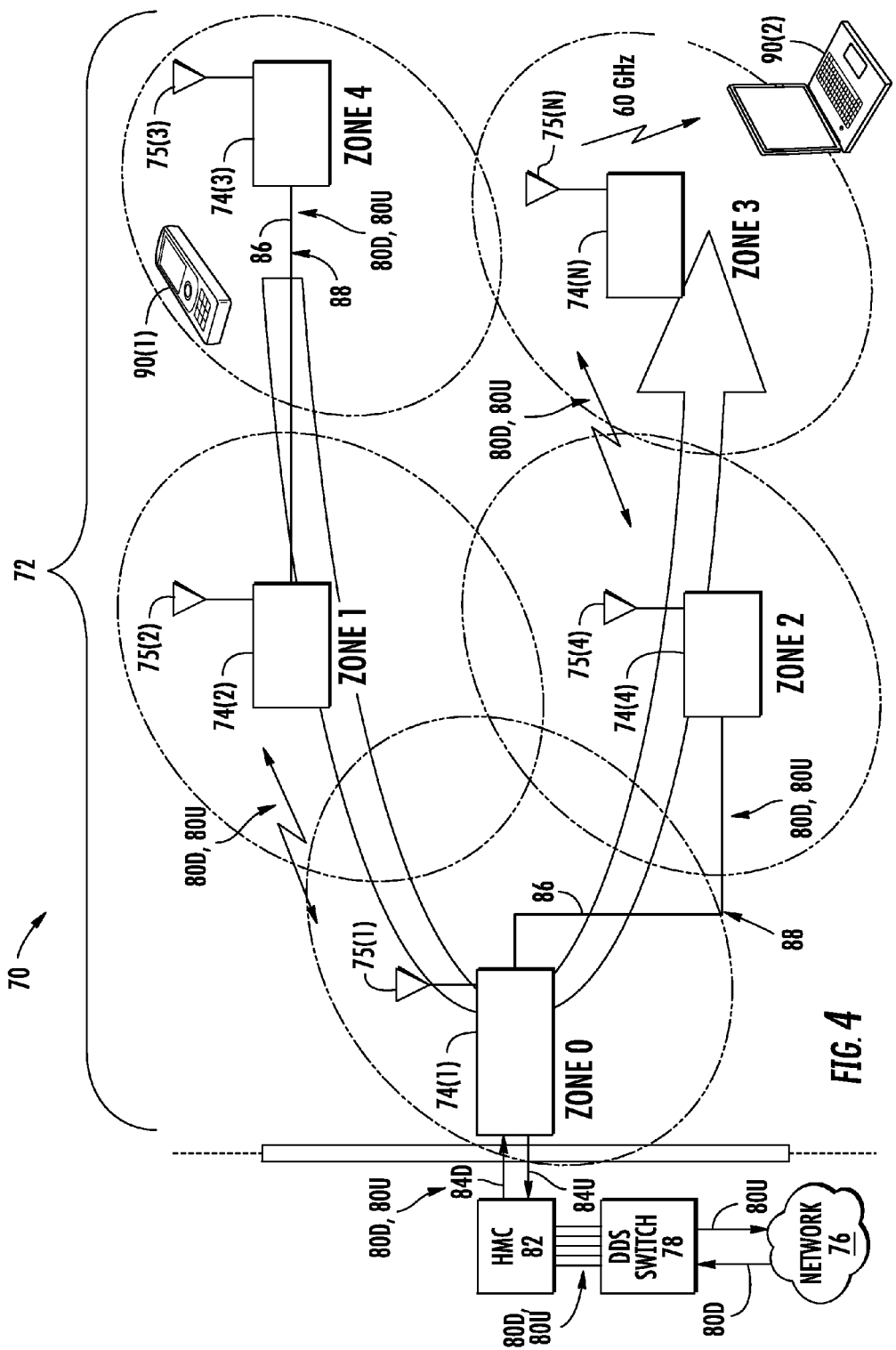
FIG. 4 is the exemplary distributed antenna system of FIG. 3 illustrating digital data signals received at a RAU from a mobile wireless client device being propagated between other RAUs to a RAU in communication with a personal computer client device.

With continuing reference to FIG. 3 the central RAU 74(1) is also configured to propagate received downlink digital data signals 80D to the other RAUs 74(2)-74(N) in the remote antenna cluster 72. The central RAU 74(1) is also configured to receive uplink digital data signals 80U from the other RAUs 74(2)-74(N) for communication over the main uplink optical fiber communications link 84U. The other RAUs 74(2)-74(N) are each configured to receive the downlink digital data signals 80D and communicate the received downlink digital data signals 80D to client devices 90(1), 90(2) in their communication range, as illustrated in FIG. 4. As non-limiting examples, other types of client devices may include wireless devices, mobile devices such as cellular phones or smart phones, electronic devices that include wireless radios, such as computers, displays, cameras, video recorders.

The other RAUs 74(2)-74(N) are also configured to receive uplink digital data signals 80U from the client devices 90(1), 90(2), as illustrated in FIG. 4. The other RAUs 74(2)-74(N) are also configured to propagate the received uplink digital data signals 80U received from the client devices 90(1), 90(2) between each other and for eventual receipt by the central RAU 74(1). The central RAU 74(1) can provide the uplink digital data signals 80U to any of the other RAUs 74(2)-74(N) and/or the digital data network 76 over the main uplink optical fiber 84U. The other RAUs 74(2)-74(N) are also configured to propagate received downlink digital data signals 80D to other RAUs 74(2)-74(N) for networked communications between different RAUs 74(1)-74(N) as illustrated in FIG. 4. For example, if it is desired to communicate uplink digital data signals 80U from client device 90(1) to client device 90(2) in FIG. 4, RAU 74(3) can propagate these communications through the other RAUs 74(2), 74(1), 74(4), and to 74(N) until the communications reach client device 90(2).

The communication connections for signal propagation for both downlink and uplink digital data signal 80D, 80U communications between the central RAU 74(1) and other RAUs 74(2)-74(N), or between RAUs 74(2)-74(N) can be through wireless communications or a physical communication link 86. As non-limiting examples, the physical communication link 86 could be electrical conductor(s) or could be optical fiber, as illustrated in FIG. 3. The physical communication link 86 could also include a power link 88 to provide power to RAUs 74(1)-74(N). The RAUs 74(1)-74(N) include power consuming components for providing communications in the distributed antenna system 70. If it is desired to not require a local power source for the RAUs 74(1)-74(N), providing the power link 88 of the physical communications link 86 can be employed to provide power to the RAUs 74(1)-74(N).

Figure 5:
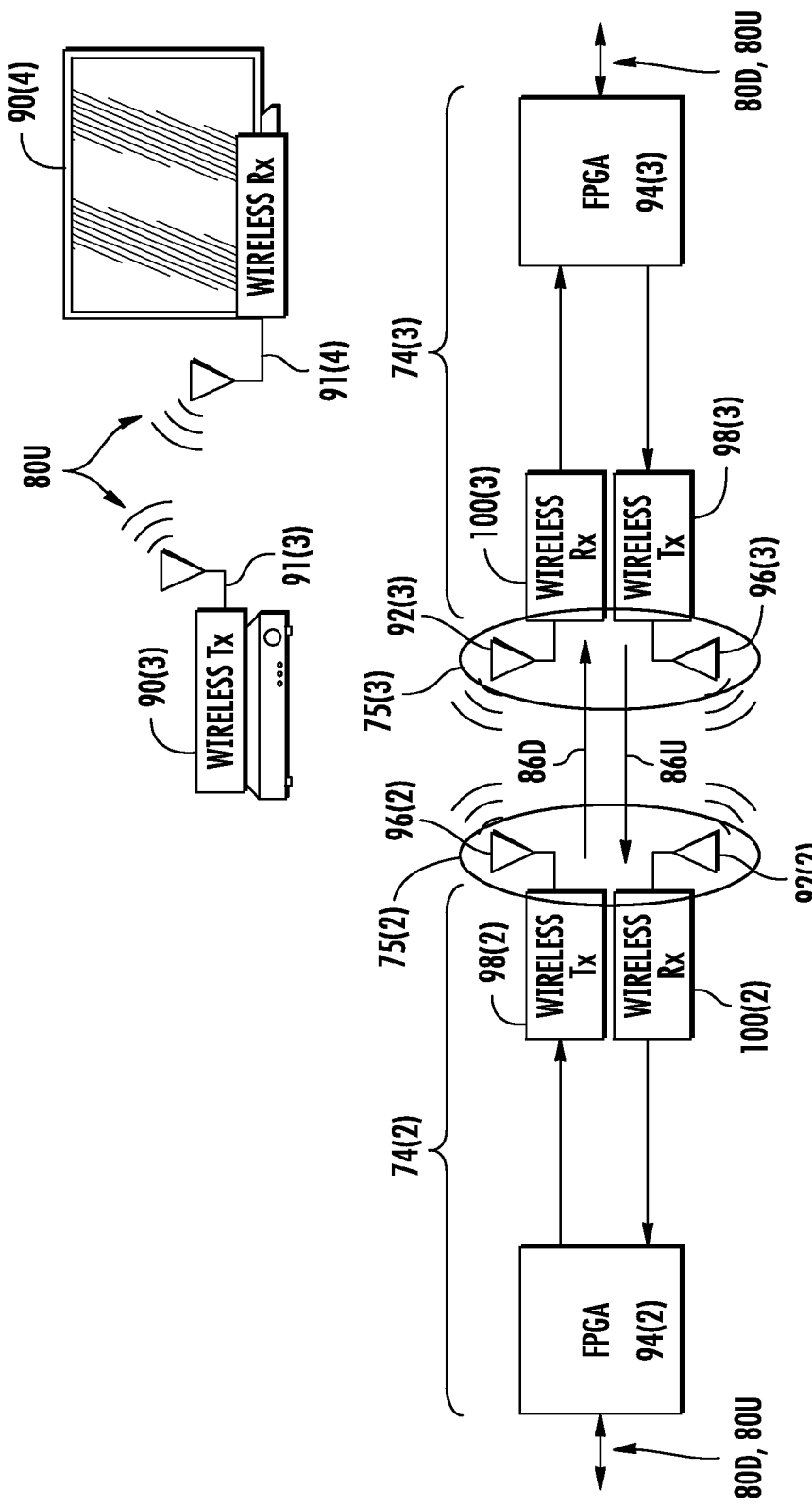
FIG. 5 is a schematic diagram of two exemplary RAUs that can be included in the remote antenna cluster in FIGS. 3 and 4 configured to wirelessly propagate the digital data signals.

FIG. 5 is a schematic diagram of two exemplary RAUs 74(2), 74(3) that can be included in the remote antenna cluster 72 in FIGS. 3 and 4 and configured to propagate the digital data signals 80D, 80U to different client devices 90(1), 90(2). For example, client device 90(3) may be a wireless audio/video (A/V) transmitter in the remote antenna cluster 72 (see FIG. 4) that is desired to transmit A/V information to a wireless display client device 90(4) also in the remote antenna cluster 72 (see FIG. 4). In this regard, the wireless A/V transmitter 90(3) would transmit, via antenna 91(3) A/V signals in the form of uplink digital data signals 80U to the RAU 74(2). The reception antenna 92(2) of the RAU 74(2) would receive the A/V uplink digital data signals 80U from the client device 90(3) which may be forwarded to circuitry, such as a field programmable gate array (FPGA) 94(2), as an example for processing. If the display client device 90(4) is in the proximity of a different RAU than RAU 74(2), for example RAU 74(3), RAU 74(2) can propagate or forward, via physical link or wireless communications, the A/V uplink digital data signals 80U from the client deice 90(3) to RAU 74(3). In this example, RAU 74(2) would transmit the A/V uplink digital data signals 80U via the transmission antenna 96(2) to the reception antenna 92(3) in the RAU 74(3). The A/V uplink digital data signals 80U could then be forwarded for processing to another FPGA 94(3) and then transmitted by transmission antenna 96(3) to the display client device 90(3). The display client device 90(4) has a wireless reception antenna 91(4) to receive the uplink A/V digital data signals 80U.

With continuing reference to FIG. 5, alternatively, the communication link between the RAUs 74(2), 74(3) could be the downlink and uplink physical communication links 86D, 86U. A downlink communications link 86D and an uplink communications link 86U could be provided between the RAUs 74(2), 74(3) to propagate digital data signals therebetween, including the uplink A/V digital data signals 80U. Further, any type of modulation of the digital data signals propagated between RAUs 74(2), 74(3) can be provided. For example, amplitude modulation (AM), frequency modulation (FM), or IQ modulation could be employed to modulate the digital data signals 80D, 80U. For example, the wireless transmitters 98(2), 98(3), and wireless receivers 100(2), 100(3) could be IQ transmitters and receivers, respectively that are configured to transmit and receive the digital data signals via IQ modulation. This modulation can also be provided over the physical communication link 86 as well.

Figure 6:
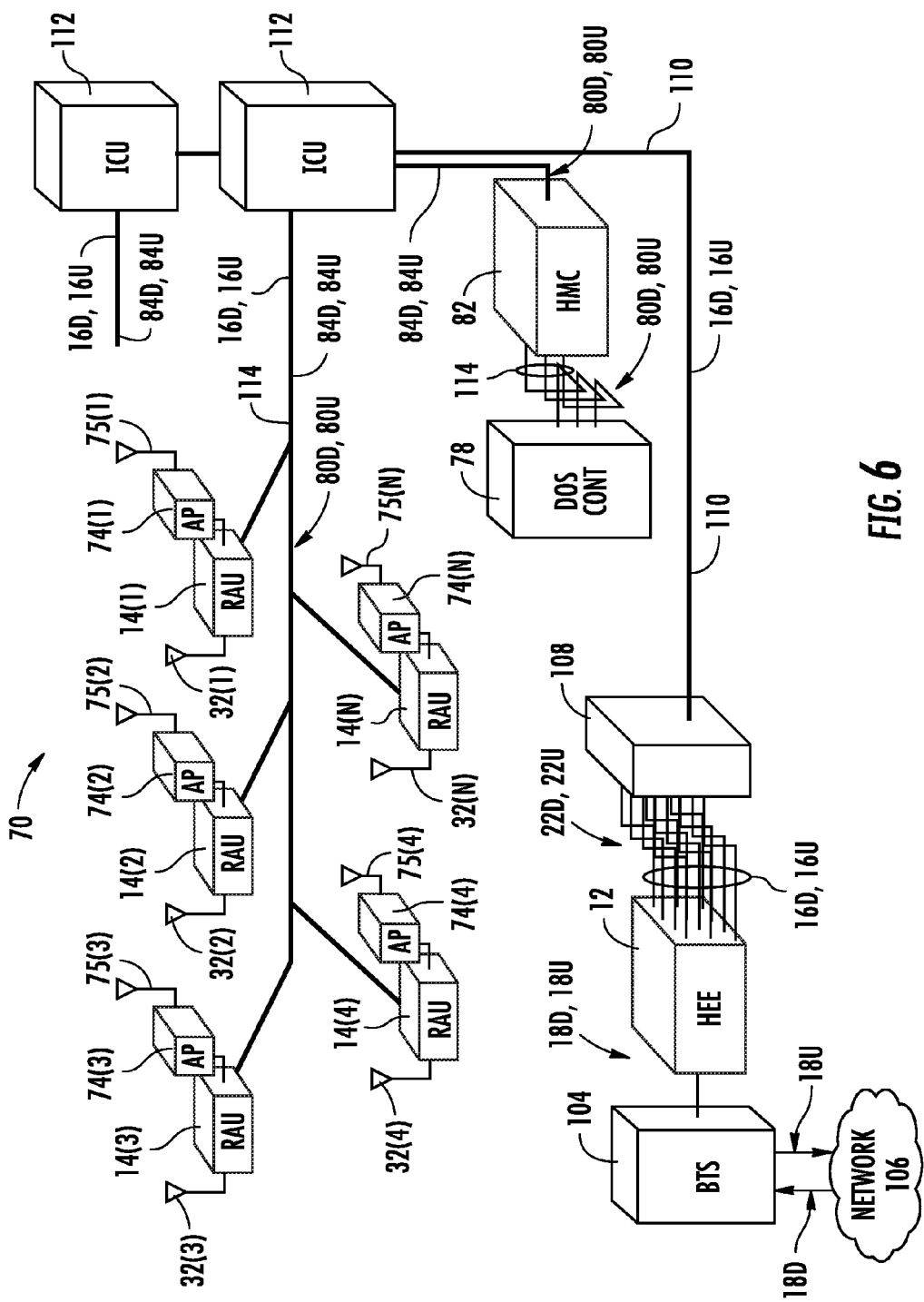
FIG. 6 is a schematic diagram of an exemplary distributed antenna system that is configured to provide both digital data services and radio-frequency (RF) communications services.
Figure 7:
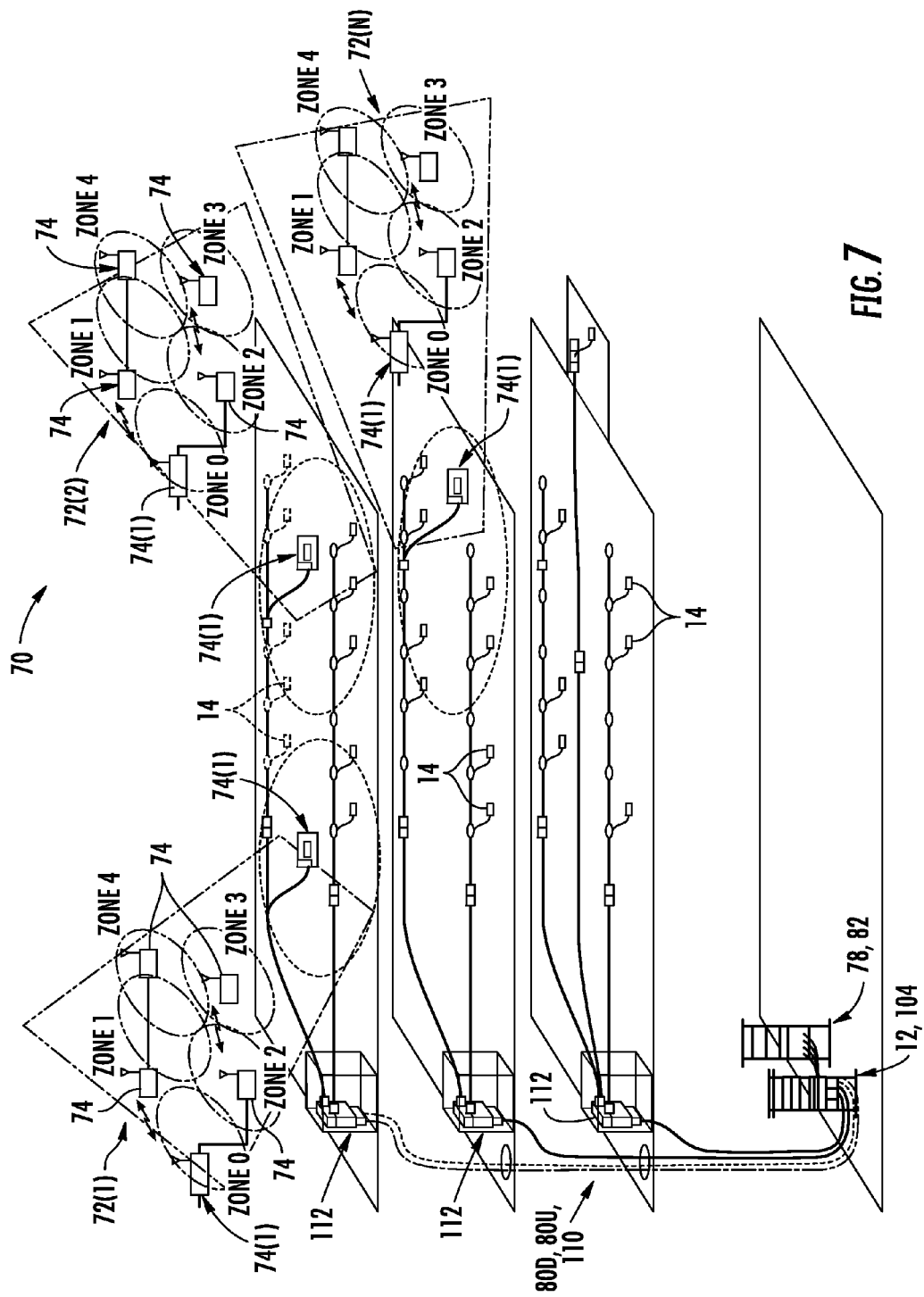
FIG. 7 is a schematic diagram of the exemplary distributed antenna system in FIG. 6 configured with multiple remote antenna clusters each having a plurality of RAUs configured to propagate digital data signals between each other and to central remote units coupled to a network.

It may be desired to also provide other communications services in the distributed antenna system 70. For example, FIG. 6 is a schematic diagram of the distributed antenna system 70 in FIGS. 3 and 4, but configured to provide both digital data services and radio-frequency (RF) communications services. FIG. 7 illustrates multiple remote antenna clusters 72(1)-72(N) to provide digital data services along with RF communication services in the distributed antenna system 70. The components of the distributed antenna system 10 in FIGS. 1 and 2 to provide RF communications services can be included in the distributed antenna system 70, as illustrated in FIG. 6 and described below.

As illustrated in FIG. 6, the HEE 12 in FIGS. 1 and 2 is provided. The HEE 12 receives the downlink electrical RF signals 18D from a base transceiver station (BTS) 104. As previously discussed, the HEE 12 converts the downlink electrical RF signals 18D to downlink optical RF signals 22D to be distributed to the RAUs 14(1-N). The HEE 12 is also configured to convert the uplink optical RF signals 22U received from the RAUs 14(1-N) into uplink electrical RF signals 18U to be provided to the BTS 104 and on to a network 106 connected to the BTS 104. A patch panel 108 may be provided to receive the downlink and uplink optical fibers 16D, 16U configured to carry the downlink and uplink optical RF signals 22D, 22U. The downlink and uplink optical fibers 16D, 16U may be bundled together in one or more riser cables 110 and provided to one or more ICUs 112, which can be provided to group digital data signals 80D, 80U and RF signals 22D, 22U along with power to be distributed.

The HEE 12 may be configured to support any frequencies desired, including but not limited to US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

Examples of ICUs 112 that may be provided in the distributed antenna system 70 to distribute both downlink and uplink optical fibers 16D, 16U for RF communication services and downlink and uplink optical fiber communications links 84D, 84U for digital data services are described in U.S. patent application Ser. No. 12/466,514 filed on May 15, 2009 and entitled "Power Distribution Devices, Systems, and Methods For Radio-Over-Fiber (RoF) Distributed Communication," incorporated herein by reference in its entirety, and U.S. Patent Application Ser. No. 61/330,385 filed on May 2, 2010 entitled "Power Distribution in Optical Fiber-based Distributed Communication Systems Providing Digital Data and Radio-Frequency (RF) Communication Services, and Related Components and Methods," both of which are incorporated herein by reference in their entireties.

With continuing reference to FIG. 6, the HMC 82 in this embodiment is configured to convert downlink electrical digital signals (or downlink electrical digital data services signals) 80D over digital line cables 114 from the DDS switch 78 into downlink optical digital signals (or downlink optical digital data services signals) 80D that can be communicated over downlink optical fiber communications link 84D to the RAUs 74, shown as access points (APs) 74(1-N) in FIG. 6. The HMC 82 is also configured to receive uplink optical digital signals 80U from the APs 74(1-N) and convert the uplink optical digital signals 80U into uplink electrical digital signals 80U to be communicated to the DDS switch 78. In this manner, the digital data services can be provided as previously described. Client devices located at the APs 74 can access these digital data services and/or RF communication services depending on their configuration.

With continuing reference to FIG. 6, some of the APs 74(1-N) are connected to the RAUs 14. In the example of APs, the APs 74 provide access to the digital data services provided by the DDS switch 78. This is because the downlink and uplink optical fiber communications links 84D, 84U carrying downlink and uplink optical digital data signals 80D, 80U converted from downlink and uplink electrical digital signals from the HMC 82 are provided to the APs 74(1-N) via the digital line cables 114 and RAUs 14 to provide the physical communications link. However, as previously discussed, the APs 74(1)-74(N) may communicate with each other via wireless communications. Digital data client devices can access the APs 74(1)-74(N) to access digital data services provided through the DDS switch 78.

Figure 8:
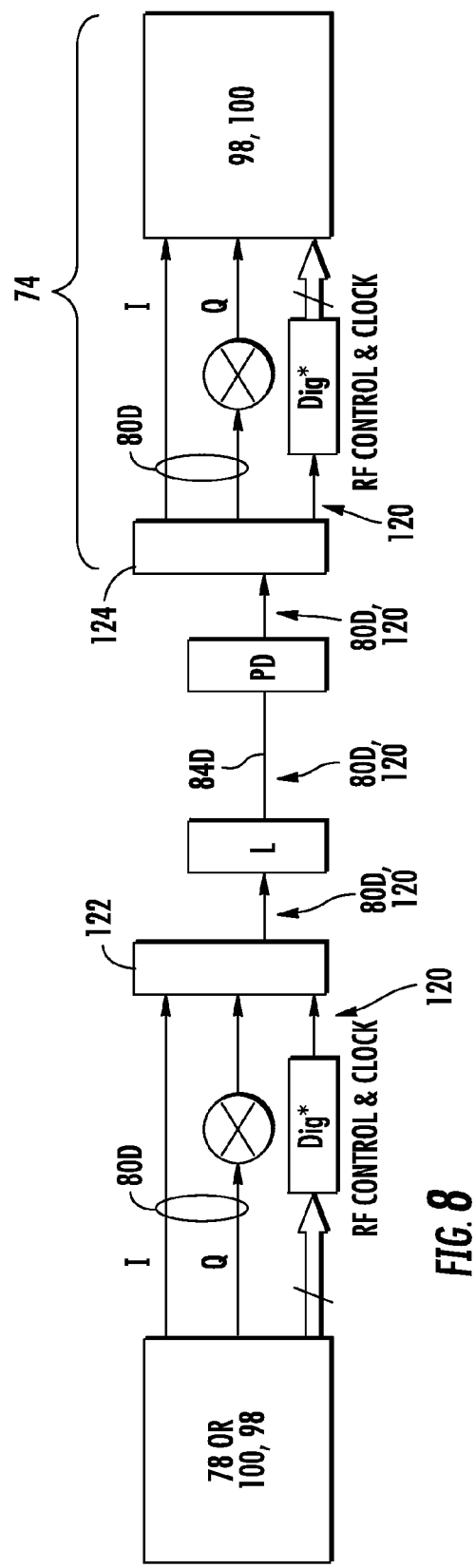
FIG. 8 is a schematic diagram of an exemplary distribution of downlink IQ digital data signals multiplexed with control signals from a digital data services (DDS) controller to a central RAU in a remote antenna cluster over a single optical fiber.

As previously discussed IQ modulation may be employed to transfer digital data signals between the DDS switch 78 and the central AP 74(1) and/or between the APs 74(1)-74(N) over physical link or wirelessly. Various distribution options are available in this regard, as illustrated in FIGS. 8-10B. These examples are illustrated with regard to downlink digital data signals 80D, but these examples can also apply to uplink digital downlink data signals 80U as well. In this regard, FIG. 8 is a schematic diagram of an exemplary distribution of downlink IQ digital data signals 80D multiplexed with control signals 120 over a single downlink optical fiber communications link 84D. A frequency multiplexor 122 multiplexes the downlink IQ digital data signals 80D with the control signals 120 before transmission on the downlink optical fiber communications link 84D. A frequency de-multiplexor 124 de-multiplexes the downlink IQ digital data signals 80D with the control signals 120.

Figure 10:
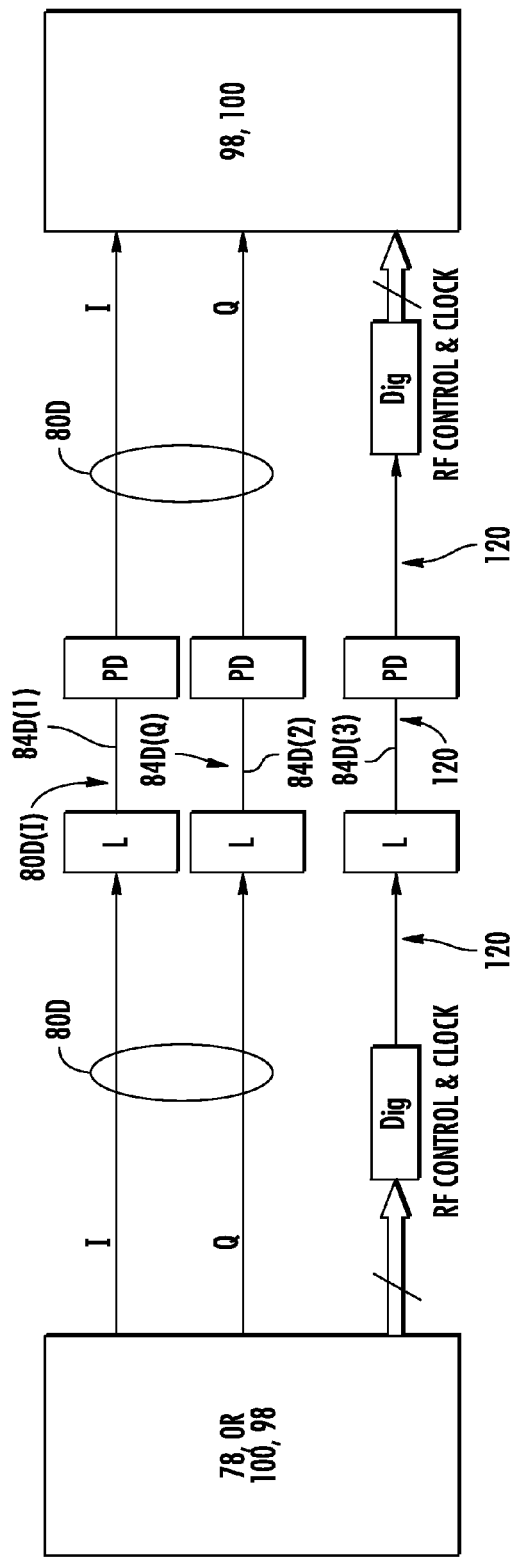
FIG. 10 is a schematic diagram of another exemplary distribution of downlink digital data signals and control signals between a DDS switch and a central RAU in a remote antenna cluster over separate optical fibers.

FIG. 9A illustrates multiplexing the Q component 80D(Q) of the downlink digital data signals 80D with the control signals 120 via multiplexor 122, and then de-multiplexing the Q component 80D(Q) of the downlink digital data signals 80D from the control signals 120 via de-multiplexer 124. The multiplexed Q component 80D(Q) of the downlink digital data signals 80D with the control signals 120 is communicated over a single downlink optical fiber communications link 84D(2). The I component 80D(I) of the downlink digital data signals 80D is communicated over a separate downlink optical fiber 84D(1). FIG. 9B is similar to FIG. 9A, but the Q component 80D(Q) of the downlink digital data signals 80D multiplexed with the control signals 120 is further multiplexed with the I component 80D(I) of the downlink digital data signals 80D via multiplexor 126. The multiplexed Q component 80D(Q) of the downlink digital data signals 80D multiplexed with the control signals 120 is de-multiplexed from the I component 80D(I) of the downlink digital data signals 80D via de-multiplexor 128. FIG. 10 illustrates the I and Q components 80D(I), 80D(Q) of the downlink digital data signals 80D and the control signals 120 each being communicated over separate downlink optical fiber communications link 84D(1)-84D(3).

Figure 11:
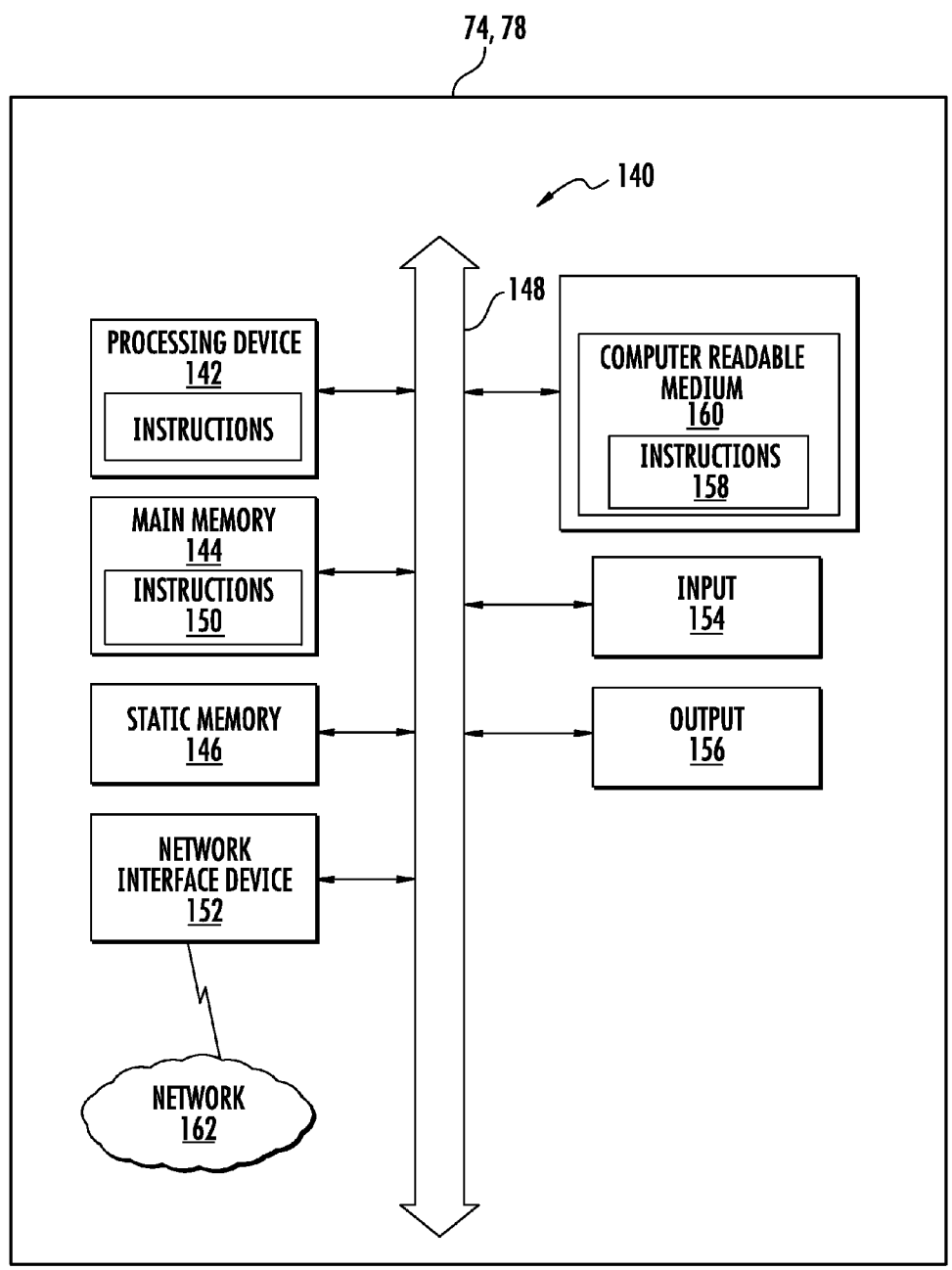
FIG. 11 is a schematic diagram of a generalized representation of an exemplary computer system that can be included in any of the DDS switches, RAUs, and/or other modules provided in the exemplary distributed antenna systems and/or their components described herein, wherein the exemplary computer system is adapted to execute instructions from an exemplary computer-readable media.

FIG. 11 is a schematic diagram representation of additional detail regarding an exemplary RAU 74, DDS switch 78 that is adapted to execute instructions from an exemplary computer-readable medium to perform the location services described herein. In this regard, the RAU 74, DDS switch 78 may include a computer system 140 within which a set of instructions for performing any one or more of the location services discussed herein may be executed. The computer system 140 may be connected (e.g., networked) to other machines in a LAN, an intranet, an extranet, or the Internet. The computer system 140 may operate in a client-server network environment, or as a peer machine in a peer-to-peer (or distributed) network environment. While only a single device is illustrated, the term "device" shall also be taken to include any collection of devices that individually or jointly execute a set (or multiple sets) of instructions to perform any one or more of the methodologies discussed herein. The computer system 150 may be a circuit or circuits included in an electronic board card, such as a printed circuit board (PCB) as an example, a server, a personal computer, a desktop computer, a laptop computer, a personal digital assistant (PDA), a computing pad, a mobile device, or any other device, and may represent, for example, a server or a user's computer.

The exemplary computer system 140 in this embodiment includes a processing device or processor 142, a main memory 144 (e.g., read-only memory (ROM), flash memory, dynamic random access memory (DRAM) such as synchronous DRAM (SDRAM), etc.), and a static memory 146 (e.g., flash memory, static random access memory (SRAM), etc.), which may communicate with each other via the data bus 148. Alternatively, the processing device 142 may be connected to the main memory 144 and/or static memory 146 directly or via some other connectivity means. The processing device 142 may be a controller, and the main memory 144 or static memory 146 may be any type of memory.

The processing device 142 represents one or more general-purpose processing devices such as a microprocessor, central processing unit, or the like. More particularly, the processing device 142 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 142 is configured to execute processing logic in instructions 150 for performing the operations and steps discussed herein.

The computer system 140 may further include a network interface device 152. The computer system 140 also may or may not include an input 154 to receive input and selections to be communicated to the computer system 140 when executing instructions. The computer system 140 also may or may not include an output 156, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 140 may or may not include a data storage device that includes instructions 158 stored in a computer-readable medium 160. The instructions 158 may also reside, completely or at least partially, within the main memory 144 and/or within the processing device 142 during execution thereof by the computer system 140, the main memory 144 and the processing device 142 also constituting computer-readable medium. The instructions 158 may further be transmitted or received over a network 162 via the network interface device 152.

While the computer-readable medium 160 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical and magnetic medium, and carrier wave signals.

The embodiments disclosed herein include various steps. The steps of the embodiments disclosed herein may be performed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes a machine-readable storage medium (e.g., read only memory ("ROM"), random access memory ("RAM"), magnetic disk storage medium, optical storage medium, flash memory devices, etc.), a machine-readable transmission medium (electrical, optical, acoustical, or other form of propagated signals (e.g., carrier waves, infrared signals, digital signals, etc.)), etc.

Unless specifically stated otherwise as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art would further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A controller may be a processor. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art would also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, as used herein, it is intended that terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. The optical fibers disclosed herein can be single mode or multi-mode optical fibers. Likewise, other types of suitable optical fibers include bend-insensitive optical fibers, or any other expedient of a medium for transmitting light signals. An example of a bend-insensitive, or bend resistant, optical fiber is ClearCurve® Multimode fiber commercially available from Corning Incorporated. Suitable fibers of this type are disclosed, for example, in U.S. Patent Application Publication Nos. 2008/0166094 and 2009/0169163, the disclosures of which are incorporated herein by reference in their entireties.

Many modifications and other embodiments of the embodiments set forth herein will come to mind to one skilled in the art to which the embodiments pertain having the benefit of the teachings presented in the foregoing descriptions and the associated drawings. For example, the remote antenna clusters and distributed antenna systems could include any type or number of communications mediums, including but not limited to electrical conductors, optical fiber, and air (i.e., wireless transmission). The distributed antenna systems may distribute any type of communications signals, including but not limited to RF communications signals and digital data communications signals, examples of which are described in U.S. patent application Ser. No. 12/892,424 entitled "Providing Digital Data Services in Optical Fiber-based Distributed Radio Frequency (RF) Communications Systems, And Related Components and Methods," incorporated herein by reference in its entirety. Multiplexing, such as WDM and/or FDM, may be employed in any of the distributed antenna systems described herein, such as according to the examples provided in U.S. patent application Ser. No. 12/892,424.

Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

We claim:

1. A remote antenna cluster supporting signal propagation among remote antenna units in a distributed communications system, the remote antenna cluster comprising:
   a first remote antenna unit (RAU) provided in a first coverage zone; and
   at least one second RAU provided in at least one second coverage zone overlapping with the first coverage zone, wherein the first coverage zone and the at least one second coverage zone are configured to:
form a common coverage area in an overlapping portion of the first coverage zone and the at least one second coverage zone;
form a first non-overlapping coverage area in the first coverage zone and not overlapping with the common coverage area; and
form at least one second non-overlapping coverage area in the at least one second coverage zone and not overlapping with the common coverage area;
wherein the first RAU is configured to:
receive downlink signals over at least one downlink communications link and communicate the received downlink signals to first client devices located in the first coverage zone;
receive first uplink signals from the first client devices and communicate the received first uplink signals over at least one uplink communications link;
propagate the received downlink signals to the at least one second RAU; and receive second uplink signals from the at least one second RAU for communication over the at least one uplink communications link;
wherein the at least one second RAU is configured to:
receive the downlink signals and communicate the received downlink signals to second client devices located in the at least one second coverage zone;
receive the second uplink signals from the second client devices located in the at least one second non-overlapping coverage area; and
propagate the received second uplink signals for receipt by the first RAU;
wherein the first RAU is further configured to communicate the second uplink signals received from the at least one second RAU to the first client devices located in the first non-overlapping coverage area.

2. The remote antenna cluster of claim 1, wherein the at least one second RAU is further configured to propagate the received downlink signals to another RAU.

3. The remote antenna cluster of claim 1, wherein the first RAU is configured to propagate the received downlink signals from the at least one downlink communications link.

4. The remote antenna cluster of claim 1, wherein the first RAU is configured to propagate the received downlink signals over a physical communications link to the at least one second RAU.

5. The remote antenna cluster of claim 4, wherein the physical communications link is comprised from a group consisting of at least one electrical conductor and at least one optical fiber.

6. The remote antenna cluster of claim 5, wherein the physical communications link further includes a power link configured to deliver power to the first RAU.

7. The remote antenna cluster of claim 1, wherein the first RAU is configured to propagate the received downlink signals wirelessly to the at least one second RAU.

8. The remote antenna cluster of claim 1, wherein the first RAU is configured to receive the second uplink signals from the at least one second RAU over a physical communications link.

9. The remote antenna cluster of claim 1, wherein the first RAU is configured to wirelessly receive the second uplink signals from the at least one second RAU.

10. The remote antenna cluster of claim 1, wherein the at least one second RAU is comprised of a plurality of second RAUs.

11. The remote antenna cluster of claim 10, wherein a first RAU among the plurality of second RAUs is configured to:
propagate the received downlink signals to a second RAU among the plurality of second RAUs; and
receive the second uplink signals from the second RAU among the plurality of second RAUs.

12. The remote antenna cluster of claim 11, wherein the second RAU among the plurality of second RAUs is configured to:
propagate the received downlink signals to the first RAU among the plurality of second RAUs; and
receive the second uplink signals from the first RAU among the plurality of second RAUs.

13. The remote antenna cluster of claim 1, wherein the first RAU and the at least one second RAU are configured in an RAU duster.

14. The remote antenna cluster of claim 1, wherein the downlink signals are modulated at a center frequency of 60 Giga Hertz (GHz).

15. The remote antenna cluster of claim 1, wherein at least one of the at least one downlink communications link and the at least one uplink communications link further includes a power link configured to deliver power to the at least one second RAU.

16. The remote antenna cluster of claim 1, wherein the at least one downlink communications link is comprised of a single optical fiber.

17. The remote antenna cluster of claim 1, wherein the at least one uplink communications link is comprised of a single optical fiber.

18. The remote antenna cluster of claim 1, wherein the at least one downlink communications link is comprised of a plurality of optical fibers.

19. The remote antenna cluster of claim 1, wherein the at least one uplink communications link is comprised of a plurality of optical fibers.

20. The remote antenna cluster of claim 1, further comprising a frequency multiplexor configured to frequency multiplex in-phase and quadrature (IQ) modulated downlink signals communicated over the at least one downlink communications link to the first RAU.

21. The remote antenna cluster of claim 1, further comprising a frequency de-multiplexor configured to frequency de-multiplex in-phase and quadrature (IQ) modulated downlink signals received from at least one downlink communications link.

22. The remote antenna cluster of claim 1, wherein the first RAU is configured to:
wirelessly communicate the received downlink signals to first wireless client devices; and
wirelessly receive the first uplink signals from the first wireless client devices.

23. The remote antenna cluster of claim 1, wherein the at least one second RAU is configured to:
wirelessly communicate the received downlink signals to second wireless client devices; and
wirelessly receive the second uplink signals from the second wireless client devices.

24. The remote antenna cluster of claim 1, wherein the first RAU is configured to:
receive the downlink signals from a remotely located controller; and
communicate the received first uplink signals over the at least one uplink communications link to the remotely located controller.

25. The remote antenna cluster of claim 24, wherein the remotely located controller is comprised of a switch.

26. The remote antenna cluster of claim 25, wherein the switch is comprised of an Ethernet switch.

27. A method of propagating signals between remote antenna units in a remote antenna cluster in a distributed communications system, the method comprising:
    providing a first remote antenna unit (RAU) in a first coverage zone;
    providing at least one second RAU in at least one second coverage zone overlapping with the first coverage zone, wherein the first coverage zone and the at least one second coverage zone are configured to:
        form a common coverage area in an overlapping portion of the first coverage zone and the at least one second coverage zone;
        form a first non-overlapping coverage area in the first coverage zone and not overlapping with the common coverage area; and
        form at least one second non-overlapping coverage area in the at least one second coverage zone and not overlapping with the common coverage area;
    receiving, in the first RAU, downlink signals over at least one downlink communications link and communicating the received downlink signals to first client devices located in the first coverage zone;
    receiving, in the first RAU, first uplink signals from the first client devices and communicating the received first uplink signals over at least one uplink communications link;
    propagating the received downlink signals from the first RAU to the at least one second RAU;
    receiving, in the first RAU, second uplink signals from the at least one second RAU for communication over the at least one uplink communications link;
    receiving, in the at least one second RAU, the received downlink signals and communicating the received downlink signals to second client devices located in the at least one second coverage zone;
    receiving, in the at least one second RAU, the second uplink signals from the second client devices located in the at least one second non-overlapping coverage area;
    propagating the received second uplink signals for receipt by the first RAU; and
    communicating the second uplink signals received by the first RAU from the at least one second RAU to the first client devices located in the first non-overlapping coverage area.

28. The method of claim 27, further comprising the at least one second RAU propagating the received downlink signals to another RAU.

29. The method of claim 27, further comprising the first RAU propagating the received downlink signals from the at least one downlink communications link.

30. The method of claim 27, further comprising the first RAU propagating the received downlink signals over a physical communications link to the at least one second RAU.

31. The method of claim 27, comprising:
    receiving, in the first RAU, the downlink signals over the at least one downlink communications link from a remotely located controller; and
    communicating the received first uplink signals over the at least one uplink communications link to the remotely located controller.

32. The method of claim 31, wherein the remotely located controller is comprised of a switch.

* * * * *

UNITED STATES PATENT AND TRADEMARK OFFICE
CERTIFICATE OF CORRECTION

PATENT NO. : 10,014,944 B2
APPLICATION NO. : 14/664305
DATED : July 3, 2018
INVENTOR(S) : Igor Berlin et al Page 1 of 1

It is certified that error appears in the above-identified patent and that said Letters Patent is hereby corrected as shown below:

On the Title Page

On page 5, Column 1, item (56), U.S. Patent Documents, Line 3, delete "Beaman et al." and insert -- Beamon et al. --, therefor.

In the Claims

In Column 20, Line 16, Claim 13, delete "duster." and insert -- cluster. --, therefor.

In Column 20, Line 45, Claim 21, delete "from at least" and insert -- from the at least --, therefor.

Signed and Sealed this
Twenty-eighth Day of September, 2021

Drew Hirshfeld
*Performing the Functions and Duties of the*
*Under Secretary of Commerce for Intellectual Property and*
*Director of the United States Patent and Trademark Office*